US008699606B2

(12) United States Patent
Rezk et al.

(10) Patent No.: US 8,699,606 B2
(45) Date of Patent: Apr. 15, 2014

(54) SYSTEM AND METHOD FOR TRANSMITTER AND RECEIVER OPERATION FOR MULTIPLE-INPUT, MULTIPLE-OUTPUT COMMUNICATIONS BASED ON PRIOR CHANNEL KNOWLEDGE

(75) Inventors: Meriam Khufu Ragheb Rezk, Stanford, CA (US); Cornelius van Rensburg, Wylie, TX (US)

(73) Assignee: FutureWei Technologies, Inc., Plano, TX (US)

( * ) Notice: Subject to any disclaimer, the term of this patent is extended or adjusted under 35 U.S.C. 154(b) by 420 days.

(21) Appl. No.: 12/871,611

(22) Filed: Aug. 30, 2010

(65) Prior Publication Data

US 2011/0064167 A1 Mar. 17, 2011

Related U.S. Application Data

(60) Provisional application No. 61/243,207, filed on Sep. 17, 2009.

(51) Int. Cl.
H04B 7/02 (2006.01)
(52) U.S. Cl.
USPC .......................................... 375/267; 375/316
(58) Field of Classification Search
USPC ............................. 375/267, 340, 350
See application file for complete search history.

(56) References Cited

U.S. PATENT DOCUMENTS

| 6,704,376 | B2 | 3/2004 | Mills et al. | |
|---|---|---|---|---|
| 2003/0099308 | A1* | 5/2003 | Cao et al. | 375/340 |
| 2003/0231725 | A1* | 12/2003 | Scarpa | 375/350 |
| 2008/0310554 | A1* | 12/2008 | Siti et al. | 375/340 |

FOREIGN PATENT DOCUMENTS

| CN | 101170317 A | 4/2008 |
|---|---|---|
| CN | 101345592 A | 1/2009 |
| CN | 101374038 A | 2/2009 |

OTHER PUBLICATIONS

"International Search Report and Written Opinion," International Application No. PCT/CN2010/077038, Applicant: Huawei Technologies Co. Ltd., et al., mailing date: Dec. 30, 2010, 12 pages.
Belfiore, J-C., et al., "The Golden Code: A 2 X 2 Full-Rate Space-Time Code With Nonvanishing Determinants," IEEE Transactions on Information Theory, vol. 51, No. 4, Apr. 2005, pp. 1432-1436.
Rezk, M., et al., "Blind MIMO using the Golden Code," Proceedings of the 43$^{rd}$ Asilomar Conference on Signals, Systems, and Computers, Nov. 2009, 5 pages.

(Continued)

Primary Examiner — Daniel Washburn
Assistant Examiner — Fitwi Hailegiorgis
(74) Attorney, Agent, or Firm — Slater & Matsil, L.L.P.

(57) ABSTRACT

A system and method for transmitter and receiver operation for multiple-input, multiple-output (MIMO) communications based on prior channel knowledge are provided. A method for receiver operations includes receiving a data block, determining if there is confidence in information related to a channel, detecting data in the data block with a first detector in response to determining that there is confidence in the information, and detecting the data in the data block with a second detector in response to determining that there is no confidence in the information. The data block is received over the channel.

26 Claims, 16 Drawing Sheets

(56) References Cited

OTHER PUBLICATIONS

Rezk, M., et al., "On High Performance MIMO Communications with Imperfect Channel Knowledge," IEEE Transactions on Wireless Communications, vol. 10, No. 2, Feb. 2011, pp. 602-613.

Taricco, G., et al., "Space-Time Decoding With Imperfect Channel Estimation," IEEE Transactions on Wireless Communications, vol. 4, No. 4, Jul. 2005, pp. 1874-1888.

Tarokh, V., et al., "Space-Time Codes for High Data Rate Wireless Communication: Performance Criterion and Code Construction," IEEE Transactions on Information Theory, vol. 44, No. 2, Mar. 1998, pp. 744-765.

Wu, Y., et al., "Detection for MIMO Systems with Imprecise Channel Knowledge," IEEE, 2003, 4 pages.

Xu, W., et al., "On Exact Maximum-Likelihood Detection for Non-Coherent MIMO Wireless Systems: A Branch-Estimate-Bound Optimization Framework," IEEE, Jul. 6-11, 2008, pp. 2017-2021, Toronto Canada.

* cited by examiner

SYSTEM AND METHOD FOR TRANSMITTER AND RECEIVER OPERATION FOR MULTIPLE-INPUT, MULTIPLE-OUTPUT COMMUNICATIONS BASED ON PRIOR CHANNEL KNOWLEDGE

This application claims the benefit of U.S. Provisional Patent Application Ser. No. 61/243,207, filed Sep. 17, 2009, and entitled "System and Method for Transmitter and Receiver Operation for MIMO Communication based on Prior Channel Knowledge," which application is hereby incorporated herein by reference.

TECHNICAL FIELD

The present invention relates generally to wireless communications, and more particularly to a system and method for transmitter and receiver operation for multiple-input, multiple-output (MIMO) communications based on prior channel knowledge.

BACKGROUND

Increasing demands for high data-rate, high-performance wireless transmission has motivated current and evolving wireless standards towards the use of multiple antennas at both a transmitter and a receiver of a communications device of a communications system. The use of multiple transmit and receive antennas may be referred to as MIMO, adaptive antenna systems (AAS), and so forth.

Generally, MIMO technology relies on coherent detection which necessitates estimating a channel between each transmit-receiver antenna pair. Estimating the channel(s) may require a substantial number of pilots to provide a good channel estimate. In practice, only a minimal number of pilots are included in a transmission since the presence of the pilots take away valuable bandwidth. Therefore, the communications system often relies on integrating pilot energy over multiple symbols to get a desired degree of channel estimation accuracy.

In communications systems, the integration time may be limited by the rate of variation of the channel. The rate of variation may cause significant errors in the channel estimate as a mobility of a communications device increases, i.e., a highly mobile communications device may have a high rate of variation, thereby potentially leading to significant errors in the channel estimates.

Another technique that may be used to estimate the channels is commonly referred to as blind techniques, sometimes also referred to as joint channel-symbol estimation techniques, in order to provide an estimate of the channel based on a previously received transmission. Again, noise and outdated data, especially when the channel is changing fast (due to a highly mobile communications device, for example), are inevitable problems which might cause significant channel estimation errors. These errors may lead to significant performance degradation using the conventional coherent detection approach.

SUMMARY OF THE INVENTION

These and other problems are generally solved or circumvented, and technical advantages are generally achieved, by preferred embodiments of the present invention which provide a system and method for transmitter and receiver operation for MIMO communications based on prior channel knowledge.

In accordance with a preferred embodiment of the present invention, a method for receiver operations is provided. The method includes receiving a data block, determining if there is information related to a channel, and if there is no information related to the channel, detecting data in the data block with a first detector. The data block is received over the channel. The method also includes if there is information related to the channel, determining if there is confidence in the information related to the channel, detecting data in the data block with a second detector if there is confidence in the information, and detecting the data in the data block with the first detector if there is no confidence in the information.

In accordance with another preferred embodiment of the present invention, a method for receiver operations is provided. The method includes a) receiving a data block from a transmitter, b) computing a set of possible vectors of information symbols based on an availability of information related to a channel and a confidence in the information related to the channel, c) ordering the data block, and d) determining whether or not operating conditions are met. The data block is received over the channel. The method also includes e) if operating conditions are not met, e1) computing a test position, e2) selecting a codeword from the set of possible vectors based on the test position, e3) computing a metric based on matrices of the data block corresponding to matrix indices less than or equal to the matrix index and a solution set of codewords selected for matrices of the data block corresponding to matrix indices less than or equal to the matrix index, and e4) if the metric is greater than an error constraint, repeating the steps d) and e). The method further includes e5) if the metric is not greater than the error constraint, e5a) if all test positions have been evaluated, saving a codeword indexed by the codeword index in the solution set, updating the error constraint, and repeating the steps d) and e). The method additionally includes e5b) if not all test positions have been evaluated, updating the matrix index to a next matrix, and repeating the steps d) and e). The method includes f) if operating conditions are met, outputting the solution set, and processing the outputted solution set. The test position includes a matrix index to a matrix in the data block and a codeword index to a codeword in a set of codewords associated with the matrix corresponding by the matrix index.

In accordance with another preferred embodiment of the present invention, a method for transmitter operations is provided. The method includes transmitting a first data block to a receiver, and in response to not receiving a positive acknowledgement, adding at least one additional pilot sequence to the first data block, thereby producing a new first data block, and transmitting the new first data block. The first data block includes no or minimal pilot sequences. The method also includes in response to receiving the positive acknowledgement, transmitting a second data block to the receiver in response to determining that the second data block exists. The second data block includes no or minimal pilot sequences.

An advantage of an embodiment is the detection behavior of a unified detector may change based on the presence or absence of channel estimates. Therefore, if reliable channel estimates are available, then a low complexity, high performance detector may be used that takes advantage of the availability of the reliable channel estimates. However, if reliable channel estimates are not available, then a different detector may be used, where the different detector provides better performance in the presence of unreliable channel estimates and few pilots.

A further advantage of an embodiment is that a technique for improving detection performance based on hybrid automatic repeat requested (HARQ) transmissions is provided. Therefore, transmissions may adaptively adjust an amount of pilots based on operating environment conditions to help detection performance.

Yet another advantage of an embodiment is that a technique for reducing computational requirements for detection is provided. The technique may significantly reduce the computational complexity for detection of large data blocks without a lot of impact on the overall detection performance.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a MIMO communications system that makes use of an adaptive detection technique that, based on availability of reliable channel estimates, reduces computational requirements of received signal detection.

It is well known that an optimal MIMO coherent detector is a maximum likelihood (ML) detector, which may be implemented using search efficient algorithms, such as sphere decoding. However, in the presence of channel estimation errors, the MIMO coherent detector is referred to as the mismatched ML detector and it may suffer performance degradations.

A unified generalized likelihood ratio based detector (UGLRD) is presented herein takes into account available noise information about channels and allows for a unified framework that can switch to a coherent ML detector when perfect channel estimates are available and to a blind or differential detector when poor or no channel estimates are available. For example, when available channel information is unreliable, a receiver may discard the channel information and resort to blind detection, which requires the transmission of only one pilot bit per constellation dimension per block of processed data in order to alleviate scalar ambiguity inherent in blind detection. Therefore, the UGLRD may be able to ensure successful detection even in situations where only very poor or no channel estimates are available, unlike coherent detection, which would consistently fail under such conditions.

The UGLRD achieves a significant performance improvement in most cases (operating environments) over coherent detection. At high SNR, as the size of a received data block increases, the performance of the UGLRD may approach that of a reference MIMO system with perfect channel knowledge independent of the amount of error encountered in channel estimation. However, since computational complexity increases with increased data block size, a branch-estimate-bound (BEB) algorithm originally intended for non-coherent spatially multiplexed MIMO is modified to provide a computationally efficient version of the UGLRD for all data block sizes. A sub-optimal procedure is also provided to further reduce computational complexity with a small degradation in performance. The sub-optimal procedure may be extra useful in situations when large data block sizes are used.

Figure 1A:
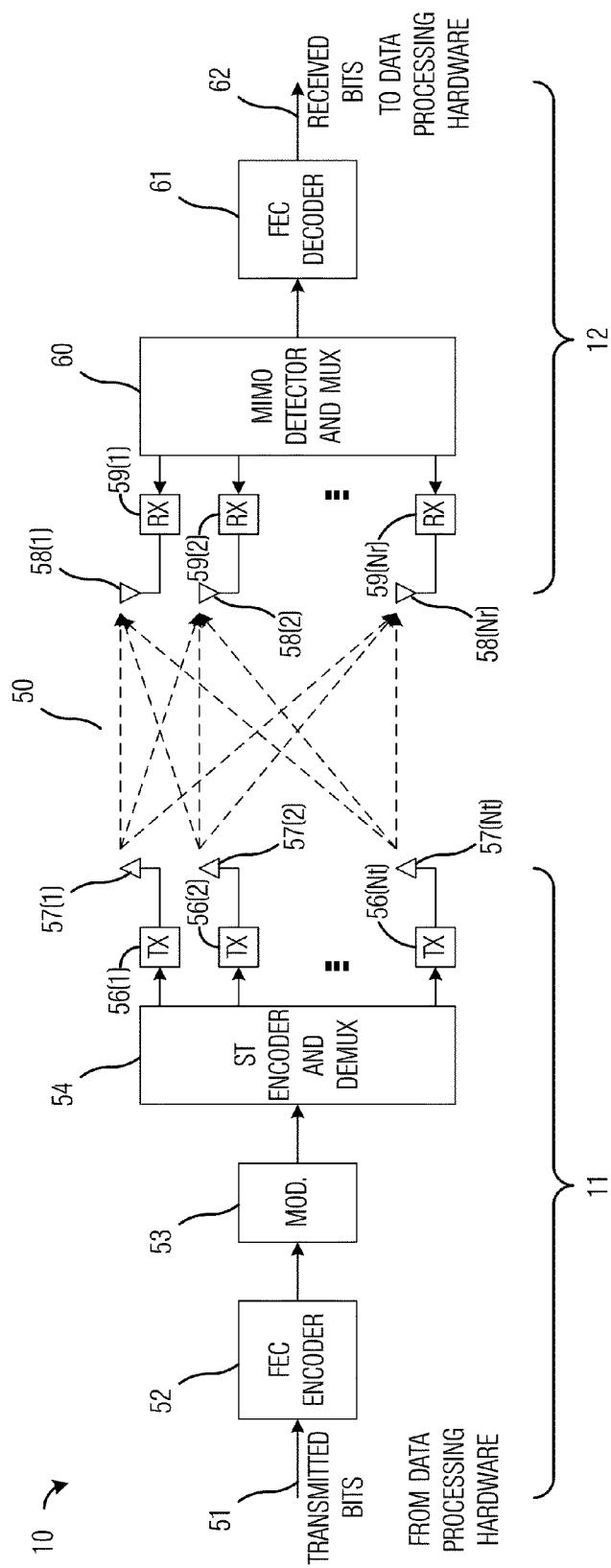
FIG. 1a is a diagram of a MIMO communications system.

FIG. 1a illustrates a MIMO communications system 10. MIMO communications system includes a transmitter 11 with Nt transmit antennas (shown as antennas 57(1) through antennas 57(Nt)) and a receiver 12 with Nr receive antennas (shown as antennas 58(1) through antennas 58(Nr)). Received data at the Nr received antennas may be expressed as:

$$Y[p]=HX[p]+V[p], \quad (1)$$

where H is an Nr×Nt channel matrix whose elements represent the channel coefficients between each transmit-receive antenna pair, X[p] is the Nt×N transmitted codeword during a p-th transmission interval which spans N time slots where N is the number of time slots needed to transmit each codeword, Y[p] is the Nr×N corresponding received data matrix, and V[p] is an Nr×N matrix whose elements represent the additive noise terms at each receive antenna at each time slot.

Transmitted bits 51 from data processing hardware, such as a processor, a data input, a user interface, and so forth, may be passed through a forward error correction (FEC) encoder 52 where an error correction code may be added to transmitted bits. A modulator 53 may be used to modulate the output of FEC encoder 52 (transmitted bits 51 with error correction code). Modulator 53 may produce modulated symbols after the output of FEC encoder 52. A space-time encoder and demultiplexer 54 may apply space-time encoding and demultiplex the information symbols into Nt×N transmitted codeword matrices (X[p]). The transmitted codeword matrices X[p] may be appropriately scaled to account for an available transmit power such that:

$$\text{trace}(X[p]X[p]^H)=P_tN_tN, \quad (2)$$

where Pt is an average total transmit power per antenna, and trace(.) is a function that returns a sum of diagonal elements of its argument.

For discussion purposes, golden codewords are used. However, the embodiments may be applicable to any codeword. Therefore, the discussion of golden codewords should not be construed as being limiting to either the scope or the spirit of the embodiments.

For golden codewords, Nt=N=2 and for each transmission, a 4×1 vector s[p] of constellation symbols at the output of modulator 53 is expressible as:

$$s[p]=[s1[p],s2[p],s3[p],s4[p]].$$

The 4×1 vector s[p] may be encoded by space-time encoder and demultiplexer 54 to provide golden codewords of the form:

$$X[p] = \frac{1}{\sqrt{5}}\begin{bmatrix} \alpha(s_1[p]+s_2[p]\theta) & \alpha(s_3[p]+s_4[p]\theta) \\ \gamma\bar{\alpha}(s_3[p]+s_4[p]\bar{\theta}) & \bar{\alpha}(s_1[p]+s_2[p]\bar{\theta}) \end{bmatrix}, \quad (3)$$

where $\gamma = i$, $\theta = \dfrac{1+\sqrt{5}}{2}$, $\alpha = 1 + i(1-\theta)$, $\bar{\theta} = 1 - \theta$, and $\bar{\alpha} = 1 + i(1-\bar{\theta})$.

The golden code generating matrix C may be expressed as:

$$C = \frac{1}{\sqrt{5}}\begin{bmatrix} \alpha & \alpha\theta & 0 & 0 \\ 0 & 0 & \gamma\bar{\alpha} & \gamma\bar{\alpha}\bar{\theta} \\ 0 & 0 & \alpha & \alpha\theta \\ \bar{\alpha} & \bar{\alpha}\bar{\theta} & 0 & 0 \end{bmatrix}.$$

Therefore, C and X[p] may be related by relationship:

$$X[p]=\text{reshape}(Cs[p],Nt,N),$$

where reshape(Cs[p],Nt,N) is a function with three inputs (Cs[p], Nt, and N). A first input is a vector Cs[p], while a second input Nt and a third input N are both positive scalar integers whose product must be equal to the dimension of the first input. reshape(Cs[p], Nt, N) orders the elements of Cs[p] into an Nt×N matrix, which is the output of reshape(Cs[p], Nt,N).

Each of the Nt available streams at an output of space-time encoder and demultiplexer 54 may then be provided to a transmit circuit 56 that transmits a corresponding stream using a Tx antenna 57. Transmit circuit 56 may be used to perform radio frequency (RF) processing on the streams, such as digital-to-analog conversion, filtering, amplifying, and so forth.

After passing through the communications channel H 50, a stream received at each of the Nr receive antennas 58 may be passed to a receive circuit 59. Receive circuit 59 may be used to perform RF processing on the streams, such as analog-to-digital conversion, filtering, amplifying, and so on. Outputs from each of the Nr receive circuits may provide the Nr×N received data matrix Y[p]. A MIMO detector and multiplexer block 60 may be used to process the received data matrix Y[p] using an algorithm, such as the modified BEB algorithms for detection using the UGLRD. The modified BEB algorithms may be implemented in a digital signal processor, a general purpose processor, a custom design integrated circuit, or so forth. Output of MIMO detector and multiplexer block 60 may then undergo FEC decoding in FEC decoder 61 to reconstruct received bits 62 from the detected codewords. Received bits 62 may then be passed to data processing hardware for processing and/or use. For example, received bits 62 may be passed to a processor for additional processing and may be used to adjust configuration and/or setting of receiver 12. Received bits 62 may also be provided to a user of receiver 12, for example, in the form of text, data, images, music, and so forth.

In practice, channel H 50 is not perfectly known and may be estimated explicitly using pilots or implicitly using joint channel-symbol estimation from a previous transmission. Therefore, in addition to data Y[p], a noisy measurement of channel H 50 may be expressed as $$Z=H+W, \quad (4)$$

where Z is a Nr×Nt measurement matrix, and W is an additive complex Gaussian noise matrix whose elements are uncorrelated and have zero-mean and variance $\sigma_h^2$. In general, W may be described as an error term that affects the channel estimate. A situation wherein the elements of the Gaussian noise matrix W are correlated may be handled in a straight forward way.

For example, under the assumption of Rayleigh fading rich scattering environment and uncorrelated channel coefficients between each transmit-receive antenna pair, $\sigma_h^2$ a may be given by $$\sigma_h^2 = \frac{\sigma^2}{T_e} + 2(1 - J_o(2\pi f_D\tau))$$

where $T_e$ is related to the time and power invested in estimating the channel, $J_o$ is the zero-th order Bessel function of the first kind, $f_D$ is the Doppler frequency associated with the maximum mobility allowed by the system and $\tau$ is the time difference between estimating the channel and using the estimate in the detection process.

Figure 1B:
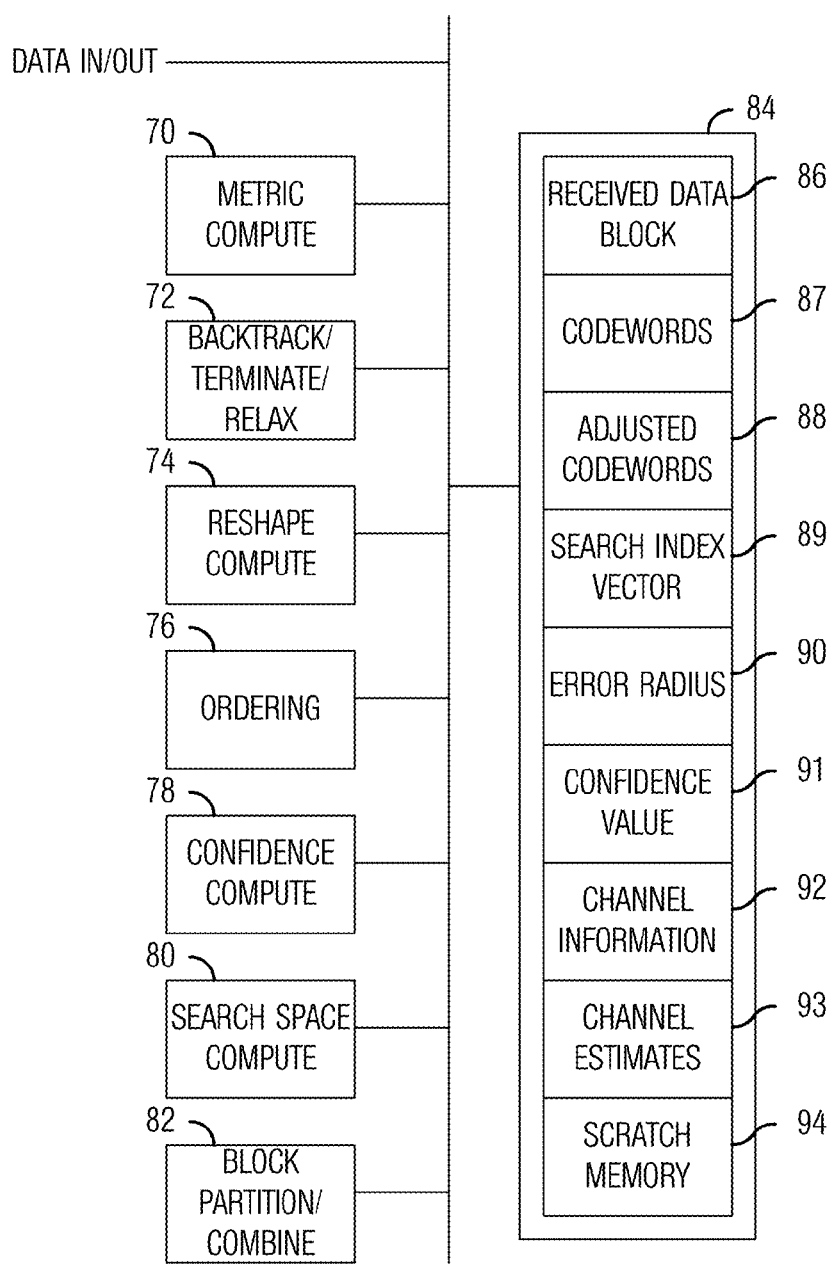
FIG. 1b is a diagram of a detailed view of a portion of MIMO detector and multiplexer block.

FIG. 1b illustrates a detailed view of a portion of MIMO detector and multiplexer block 60. As shown in FIG. 1b, portions of MIMO detector and multiplexer block 60 used in detection of received data symbols are highlighted. MIMO detector and multiplexer block 60 includes a metric compute unit 70 that may be used to compute a quality metric, such as least square error (LSE), for a selected codeword and a received data matrix of a received data block. Metric compute unit 70 may be able to provide a quantitative measurement of how close the selected codeword is to the received data matrix.

MIMO detector and multiplexer block 60 also includes a backtrack/terminate/relax condition unit 72 that may be used to reevaluate previously evaluated received data matrices to determine if they are candidates for reevaluation, as well as evaluating terminating conditions for terminating detecting codewords and/or relaxation of an error radius used to evaluate the codewords. For example, backtrack/terminate/relax condition unit 72 may select a received data matrix for reevaluation if not all codewords have been evaluated for the received data matrix. Furthermore, if all codewords for each received data matrix have been tested, then detecting codewords may terminate. However, if none of the codewords tested were of adequate quality (sufficiently close to the received data matrix), then backtrack/terminate/relax condition unit 72 may need to relax the error radius to enable the selection of a codeword.

MIMO detector and multiplexer block 60 also includes a reshape compute unit 74 that may be used to order elements of an input vector (first input) into a matrix of dimension Nt×N (second and third inputs). An ordering unit 76 may be used to order the received data block. For example, the received data block may be ordered in descending order based on a Frobenius norm of individual received data matrices. The ordering of the received data block may help to reduce computation complexity, especially for low SNR scenarios and/or large block sizes.

MIMO detector and multiplexer block 60 also includes a confidence compute unit 78. Confidence compute unit 78 may be used to compute a confidence value $\beta$ based on operating conditions of receiver MIMO communications system 10. The confidence value $\beta$ may be used to determine a quality of the channel information available for use at MIMO detector and multiplexer block 60. As an example, confidence compute unit 78 may compute the confidence value $\beta$ based on $\sigma$ and $\sigma_k$, where $\sigma$ is a standard deviation of the noise elements of V[p] in Equation (1) and $\sigma_h$ is a standard deviation of the elements of W in Equation (4) which represent the error is the channel estimate. As an example, the confidence value $\beta$ may be expressed as $\beta=\sigma/\sigma_h$. Therefore, if $\sigma_h$ is small the confidence value $\beta$ is large and there is a lot of confidence in the channel estimate, while if $\sigma_h$ is large the confidence value $\beta$ is small and there is little confidence in the channel estimate. Alternatively, the confidence value $\beta$ may be precomputed and stored for a range of $\sigma_h$.

Based on the confidence value $\beta$, a search space compute unit 80 may adjust a search space provided to the UGLRD. For example, if the confidence value $\beta$ is small, then search space compute unit 80 may adjust the search space (e.g., a set of all possible vectors of information symbols encoded in transmission codewords) to include knowledge of a single pilot bit per real constellation dimension to handle scalar ambiguity inherent in blind detection. If confidence value $\beta$ is large, then search space compute unit 80 may not need to adjust the search space to include the knowledge of the single pilot bit per real constellation dimension.

MIMO detector and multiplexer block 60 also includes a data block partition/combine unit 82. Data block partition/combine unit 82 may be used to assist in implementing a sub-optimal detection technique that reduces the computational complexity involved in processing large data blocks. Instead of using the UGLRD to process a large data block at one time, the large data block may be partitioned into a number of data blocks and the smaller data blocks may be processed by the UGLRD one small data block at a time. Alternatively, the smaller data blocks may be processed by multiple UGLRDs in parallel fashion. Results of the processing by the UGLRD may then be combined to approximate a result of the UGLRD processing on the large data block.

Metric compute unit 70, backtrack/terminate/relax condition unit 72, reshape compute unit 74, ordering unit 76, confidence compute unit 78, search space compute unit 80, and/or data block partition/combine unit 82 may be implemented as subroutines or functions in a processor, such as a general purpose processor, a digital signal processor, or so forth. Alternatively, metric compute unit 70, backtrack/terminate/relax condition unit 72, reshape compute unit 74, ordering unit 76, confidence compute unit 78, search space compute unit 80, and/or data block partition/combine unit 82 may be implemented in hardware or firmware, such as in a custom designed processor, an application specific integrated circuit, or so on. In yet another alternative, metric compute unit 70, backtrack/terminate/relax condition unit 72, reshape compute unit 74, ordering unit 76, confidence compute unit 78, search space compute unit 80, and/or data block partition/combine unit 82 may be implemented using field programmable hardware, such as field programmable logic arrays.

A memory 84 may be used to store information and data as MIMO detector and multiplexer block 60 operates on the received data block. Memory 78 may be used to store the received data block (received data block store 86), a set of codewords (codewords store 87), adjusted codewords (adjusted codewords store 88), search index vector (search index vector store 89), error radius (error radius store 90), confidence value $\beta$ (confidence value store 91), channel information (channel information store 92), channel estimates (channel estimates store 93), and so forth. Additionally, memory 78 may also include a scratch memory store 94 that may be used to store temporary variables, data, intermediate values, and so forth, computed while MIMO detector and multiplexer block 60 is operating on the received data block.

If channel H 50 is perfectly known, then the optimal coherent ML detector may compute $$\hat{X}[p] = \underset{\{X_i\}}{\mathrm{argmin}} \|Y[p] - HX_i\|^2, \tag{5}$$

where $\{X_i\}$ represents the set of all possible transmitted codewords. The detector in Equation (5) may be implemented using efficient search algorithms such as sphere decoding. More practically, channel H 50 is not readily available and instead the noisy measurement Z may be available. In such a situation, a mismatched ML detector would rely on the noisy measurement Z to perform detection expressible as $$\hat{X}[p] = \underset{\{X_i\}}{\mathrm{argmin}} \|Y[p] - ZX_i\|^2. \tag{6}$$

Expectedly, the use of the noise measurement Z would lead to a degradation in performance as compared to the detection performed in Equation (5) which assumes perfect channel knowledge. The amount of degradation in performance may depend on the variance $\sigma_h^2$ of the noise W present in the noisy measurement Z.

When no channel information is available, it may be possible to resort to non-coherent or blind detection techniques. The use of non-coherent or blind detection techniques may be performed using a sequence of P (P is a positive integer value) received data matrices of the form $$Y_B=[Y[p],Y[p+1],\ldots,Y[p+P-1]]. \quad (7)$$

The block of received data matrices of size P may correspond to a block of transmitted data matrices $$X_B=[X[p],X[p+1],\ldots,X[p+P-1]]. \quad (8)$$

Therefore, $$Y_B=HX_B+V_B, \quad (9)$$

where $$V_B=[V[p],V[p+1],\ldots,V[p+P-1]]. \quad (10)$$

The channel is assumed to be constant for the duration of the block of data, i.e., it is assumed that the channel coherence time is greater than or equal to a block interval of size P codewords. Generally, any strictly identifiable block $X_B$ of space-time codewords as in Equation (8) can be used. It has been shown that the block of data $X_B$, if constructed from Golden codewords is unidentifiable and cannot be used for blind detection. To address such a problem, a modified version of the block of data is used. The modified version of the block of data is expressible as $$X_B=[UX[p],X[p+1],\ldots,X[p+P-1]], \quad (11)$$

where U is a chosen rotation matrix. An example of U when X is made up of Golden codewords is expressible as $$U = \begin{bmatrix} -\sin(\theta) & \cos(\theta) \\ \cos(\theta) & \sin(\theta) \end{bmatrix}, \quad (12)$$

where $10<\theta<70$, or $110<\theta<170$, or $190<\theta<260$, or $280<\theta<350$ degrees. The modified version of the block of data shown in Equation (11) is strictly identifiable and may be used for blind detection. One bit per constellation dimension is allowed to be used in a handling of the scalar ambiguity problem inherent with blind detection.

Equation (9), in conjunction with Equation (11), may be used to perform blind detection. The blind detection may be expressed as $$\hat{X}_B = \underset{\{X_{B_i}\},H}{\operatorname{argmin}} \|Y_B - HX_{B_i}\|^2, \quad (13)$$

where the minimization may be carried out over $\{X_{Bi}\}$, the set of all possible transmitted sequences of P consecutive codewords, and over the unknown channel coefficients in H. First, the minimization may be performed over the unknown channel matrix, producing the result $$\hat{H}=Y_B X_{B_i}^H (X_{B_i} X_{B_i}^H)^{-1} \quad (14)$$

Then, substituting Equation (14) into Equation (13), Equation (13) may be rewritten as $$\min_{\{X_{B_i}\}} \|Y_B - Y_B X_{B_i}^H (X_{B_i} X_{B_i}^H)^{-1} X_{B_i}\| = \min_{\{X_{B_i}\}} \|Y_B P_{X_{B_i}^H}^\perp\|, \quad (15)$$

where $$P_{X_{B_i}^H}^\perp$$

is an orthogonal projection matrix defined as $$P_{X_{B_i}^H}^\perp = I - X_{B_i}^H (X_{B_i} X_{B_i}^H)^{-1} X_{B_i}. \quad (16)$$

Equation (15) may be referred to as a blind generalized likelihood ratio detector (BGLRD) or a blind MIMO detector.

When a channel estimate is available, the UGLRD as disclosed herein may take into account available noisy channel information (as given by Equation (4)). It may be convenient to scale Equation (4) so that the noise variance will be the same as the variance of $V_B$ in Equation (9). The scaling of Equation (4) may be accomplished by $$\beta Z=\beta H+\beta W, \quad (17)$$

where $\beta=\sigma/\sigma_h$. It may then be possible to combine Equations (9) and (17), the two measurement equations, into one equation expressible as $$[\beta Z,Y_B]=H[\beta I,X_B]+[\beta W,V_B], \quad (18)$$

or $$\overline{Y}_B=H\overline{X}_B+\overline{V}_B, \quad (19)$$

where $\overline{Y}_B=[\beta Z, Y_B]$, $\overline{X}_B=[\beta I, X_B]$, and $\overline{V}_B=[\beta W, V_B]$.

The UGLRD corresponding to Equation (19) may be shown to be a minimizer of) cost function $d(\overline{X}_B)$ over all possible transmitted sequences of P codewords, where $d(\overline{X}_B)$ is expressible as $$d(\overline{X}_B) = \min_{\{X_{B_i}\}} \|\overline{Y}_B P_{\overline{X}_{B_i}^H}^\perp\|, \text{ where} \quad (20)$$

$$P_{\overline{X}_{B_i}^H}^\perp = I - \overline{X}_{B_i}^H (\overline{X}_{B_i} \overline{X}_{B_i}^H)^{-1} \overline{X}_{B_i}. \quad (21)$$

The UGLRD (Equation (20)) may be shown to simplify to the blind and coherent ML MIMO detectors discussed previously. A simple intuitive explanation may also be used to show the simplification of the UGLRD. Consider the variance $\sigma_h^2$ of the noisy channel estimate Z. If $\sigma_h^2=0$, $\beta\to\infty$ then the channel estimate is perfect, i.e. Z=H, corresponding to the case of a coherent ML MIMO system in Equation (5). The UGLRD therefore simplifies to the ML coherent detector. As the channel estimate Z provides no useful information, $\beta\to 0$ corresponding to the blind MIMO scenario. The UGLRD then may switch to the blind MIMO detector in Equation (15). Setting $\beta=1$ may correspond to a high performance differential MIMO detector.

Figure 2A:
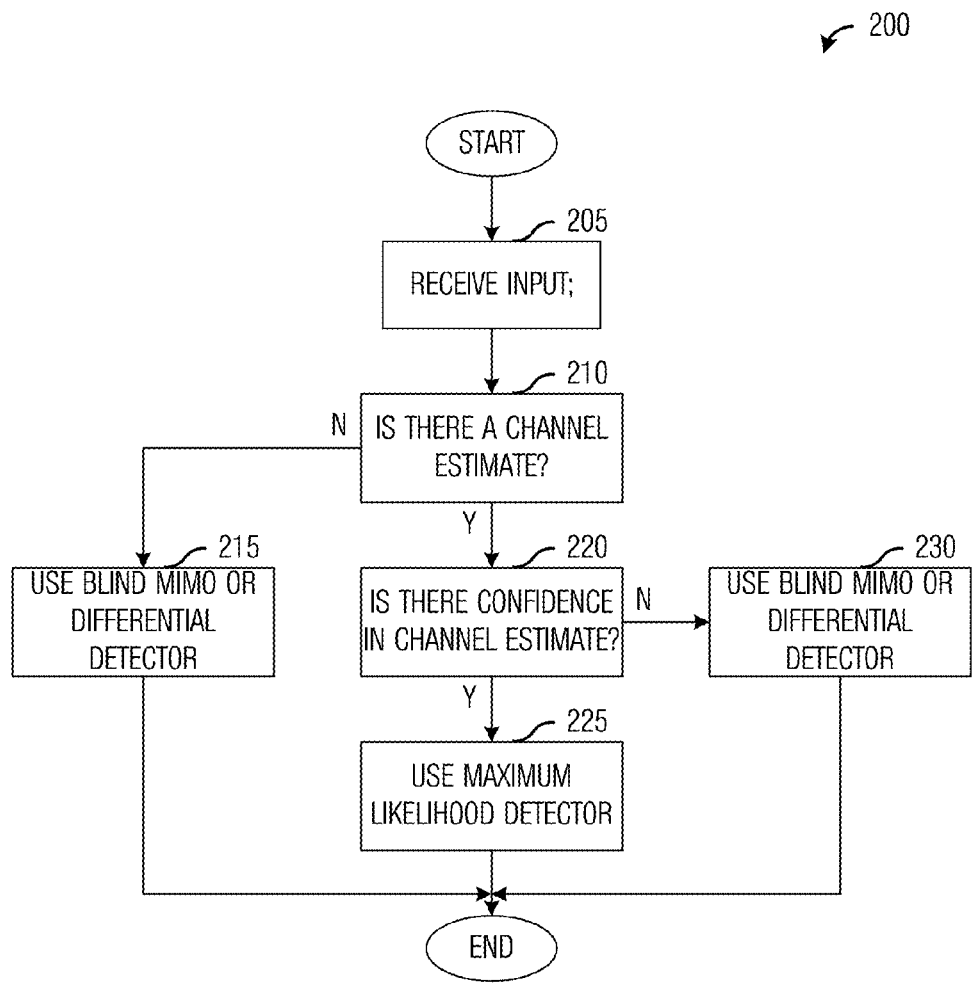
FIG. 2a is a flow diagram of receiver operations in detecting a received data block, wherein the UGLRD is used in detection of the received data block, wherein a single confidence threshold is used.

FIG. 2a illustrates a flow diagram of receiver operations 200 in detecting a received data block, wherein the UGLRD is used in detection of the received data block, and wherein a single confidence threshold is used. Receiver operations 200 may be indicative of operations occurring in a receiver, such as receiver 12 shown in FIG. 1a, as the receiver receives data blocks transmitted by a transmitter to the receiver. Receiver operations 200 may occur while the receiver is in a normal operating mode and while the receiver receives data blocks from the transmitter.

As discussed previously, the receiver may utilize the UGLRD in its detection of the received data block, wherein the UGLRD may make use of channel information, such as channel estimates, to detect the received data block. The UGLRD's use of the channel information may be dependent on the availability and/or reliability of the channel information. For example, if the UGLRD has channel information but the channel information is not reliable, then the UGLRD may decide to not utilize the channel information as it detects the received data block. The UGLRD's use of the channel information may be based on a confidence that it has in the quality of the channel information. For example, if there is confidence in the quality of the channel information (e.g., a confidence value exceeds a threshold), then the UGLRD may elect to use a ML coherent detector, while if there is no confidence in the quality of the channel information (e.g., the confidence value does not exceed the threshold), then the UGLRD may elect to use a blind or a differential detection technique.

Receiver operations 200 may begin with the receiver receiving a data block (block 205). The receiver may then compute the confidence value $\beta$ that may be based on error in the channel estimate. For example, the confidence value $\beta$ may be computed as $\beta = \sigma/\sigma_h$, where $\sigma$ is a standard deviation of the noise elements of V[p] in Equation (1) and $\sigma_h$ is a standard deviation of the elements of W in Equation (4) which represent the error is the channel estimate. The confidence value $\beta$ may be used as an indication of confidence in the channel information, e.g., the channel estimate.

A check may be performed to determine if there is a channel estimate (block 210). If there is not a channel estimate, then the receiver may make use of a blind MIMO or a differential MIMO detector to detect the data block (block 215). The use of a blind MIMO detector or a differential MIMO detector may be based on a nature of an encoding scheme applied to the data block.

If there is a channel estimate (block 210), then a check may be performed to determine if there is confidence in the channel information (block 220). For example, the confidence value $\beta$ may be compared against a threshold and if the confidence value $\beta$ is greater than the threshold, then there is confidence in the channel information. However, if the confidence value $\beta$ is not greater than the threshold, then there is no confidence in the channel information.

If there is confidence in the channel information, then the receiver may make use of a ML detector to detect the data block (block 225). While if there is no confidence in the channel information, then the receiver may make use of a blind or differential detection technique to detect the data block (block 220). Receiver operations 200 may then terminate.

Although the receiver may make use of several different detection techniques (e.g., coherent ML detection, blind, differential, or joint processing of received data together with the available channel estimate) to detect the data block based on the confidence in the channel information, it may be possible to utilize a single detection algorithm to perform the two different detection techniques. The different detection techniques may be implemented using the single detection algorithm by changing the input provided to the single detection algorithm.

Figure 2B:
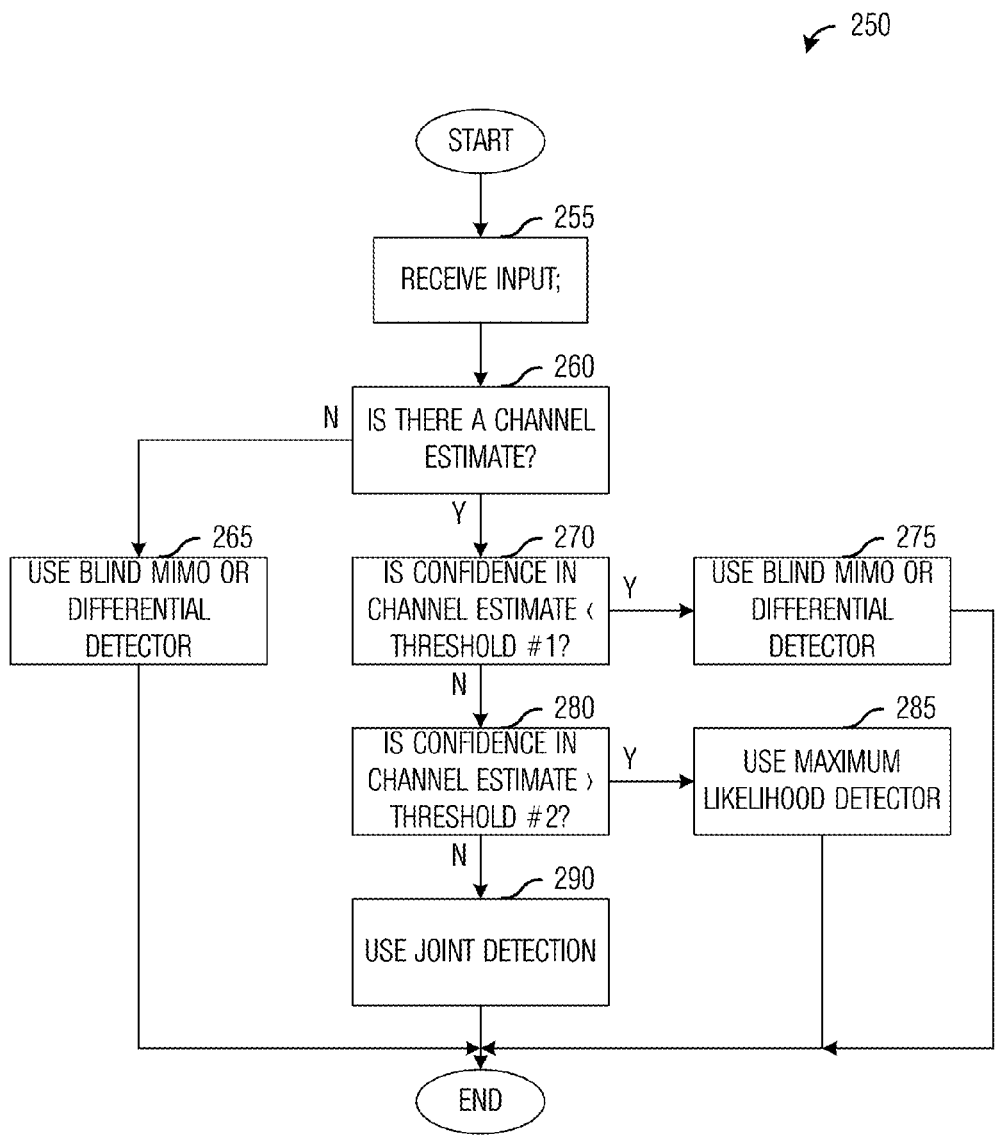
FIG. 2b is a flow diagram of receiver operations in detecting a received data block, wherein the UGLRD is used in detection of the received data block, wherein multiple confidence thresholds are used.

FIG. 2b illustrates a flow diagram of receiver operations 250 in detecting a received data block, wherein the UGLRD is used in detection of the received data block, and wherein multiple confidence thresholds are used. Receiver operations 250 may be indicative of operations occurring in a receiver, such as receiver 12 shown in FIG. 1a, as the receiver receives data blocks transmitted by a transmitter to the receiver. Receiver operations 250 may occur while the receiver is in a normal operating mode and while the receiver receives data blocks from the transmitter.

As discussed previously, the receiver may utilize the UGLRD in its detection of the received data block, wherein the UGLRD may make use of channel information, such as channel estimates, to detect the received data block. The UGLRD's use of the channel information may be dependent on the availability and/or reliability of the channel information. For example, if the UGLRD has channel information but the channel information is not reliable, then the UGLRD may decide to not utilize the channel information as it detects the received data block. The UGLRD's use of the channel information may be based on a confidence that it has in the quality of the channel information. For example, if there is confidence in the quality of the channel information (e.g., a confidence value exceeds a first threshold), then the UGLRD may elect to use a ML coherent detector, while if there is no confidence in the quality of the channel information (e.g., the confidence value does not exceed a second threshold), then the UGLRD may elect to use a blind or a differential detection technique.

However, if there is partial confidence in the quality of the channel information (e.g., the confidence value is in between the first threshold and the second threshold), then the UGLRD may elect to use a joint detection technique. When there is partial confidence in the quality of the channel information, the channel information is available, but it is not good enough to use ML coherent detection with really good results. Hence, the UGLRD may jointly process the information from the received data block along with the available channel information to detect the received data block. By using the available channel information with the ML coherent detection, detection performance may be better than simply using ML coherent detection alone.

Receiver operations 250 may begin with the receiver receiving a data block (block 255). The receiver may then compute the confidence value $\beta$ that may be based on noise in the channel. For example, the confidence value $\beta$ may be computed as $\beta = \sigma/\sigma_h$, where $\sigma$ is a standard deviation of the noise elements of V[p] in Equation (1) and $\sigma_h$ is a standard deviation of the elements of W in Equation (4) which represent the error is the channel estimate. The confidence value $\beta$ may be used as an indication of confidence in the channel information, e.g., the channel estimate.

A check may be performed to determine if there is a channel estimate (block 260). If there is not a channel estimate, then the receiver may make use of a blind MIMO or a differential MIMO detector to detect the data block (block 265). The use of a blind MIMO detector or a differential MIMO detector may be based on a nature of an encoding scheme applied to the data block.

If there is a channel estimate (block 260), then a detection technique used by the receiver may be based on a level of confidence in the channel estimate. A check may be performed to determine if the confidence in the channel information is less than a first threshold "threshold #1" (block

270). If the confidence in the channel information is less than the first threshold, then the receiver may make use of blind MIMO detection or differential detection to detect the data block (block 275).

While if the confidence in the channel information is greater than a second threshold "threshold #2" (block 280), then the receiver may make use of a ML detection technique to detect the data block (block 285). Else, the confidence in the channel information is greater than the first threshold but less than the second threshold, therefore the receiver may use joint detection (generalized likelihood ratio detection with the channel estimate) to detect the data block (block 290). When the confidence in the channel information is in between the two thresholds, there is confidence in the channel information, but the channel information may not be good enough to provide good results to allow for the use of ML detection. Therefore, generalized likelihood ratio detection may be performed in conjunction with the channel information to produce results that may be better than ML detection. Receiver operations 200 may then terminate.

Figure 3:
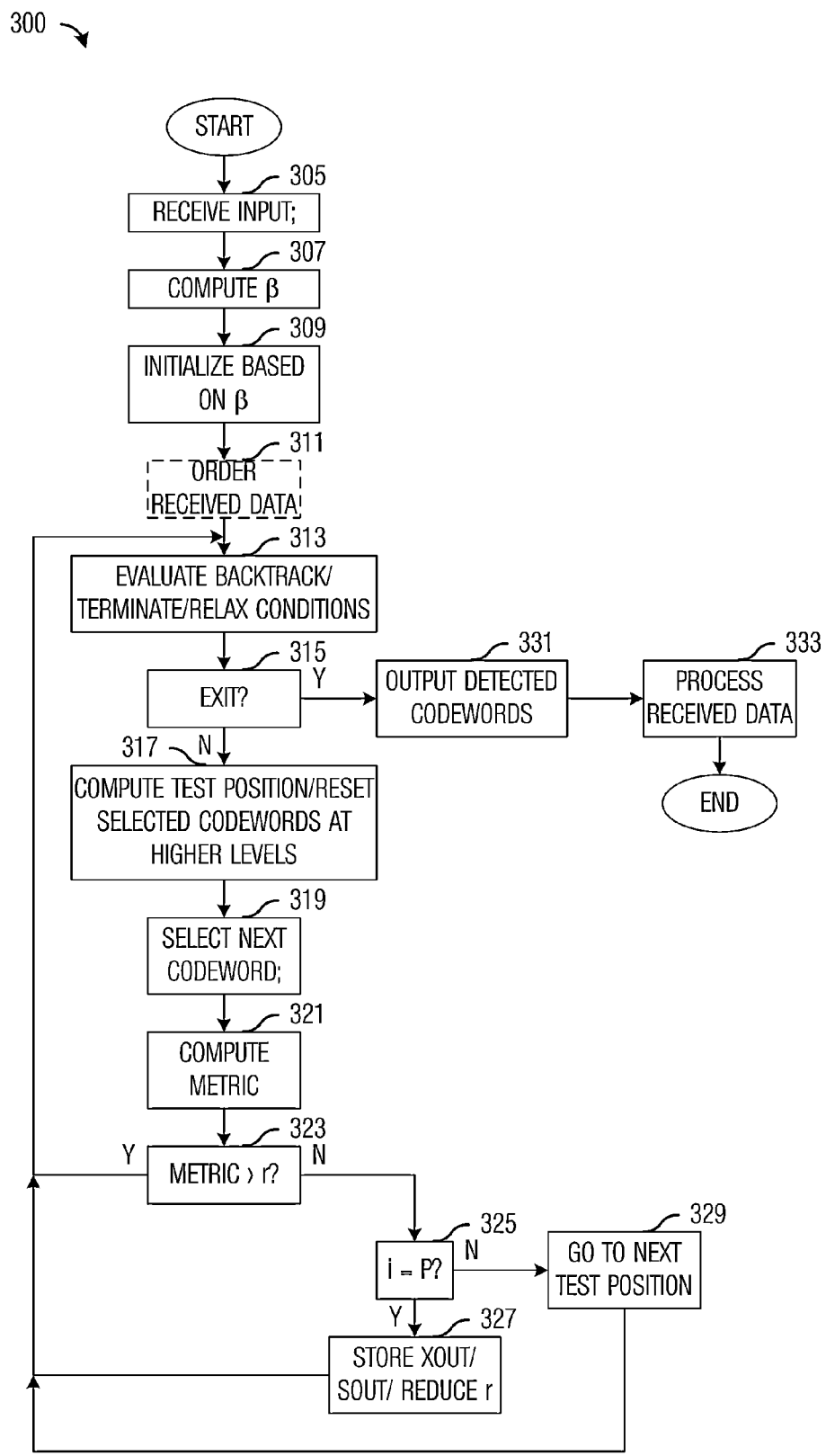
FIG. 3 is a flow diagram of receiver operations 300 in detecting a data block with the UGLRD.

FIG. 3 illustrates a flow diagram of receiver operations 300 in detecting a data block with the UGLRD. Receiver operations 300 may be indicative of operations taking place in a receiver and in a MIMO detector and multiplexer block 60 of the receiver while the receiver is in normal operations. As discussed previously, the receiver may operate using different detection techniques depending on the input provided to the UGLRD.

The discussion focuses on receiver operations for the UGLRD operating in blind detection mode or joint processing of channel estimate and the received data mode. Receiver operations 300 may begin with the receiver receiving input parameters that include a received data block, size of the received data block, error radius, space-time code generating matrix, number of transmit antennas of transmitter, number of time slots spanned by each transmitted codeword, set of all possible vectors of modulated symbols encoded in each transmitted codeword $\Psi$, a confidence value $\beta$, and so forth (block 305). If the confidence value $\beta$ is not provided as input, the receiver may need to compute the confidence value $\beta$ (block 307).

The receiver may then initialize input parameters to the UGLRD based on the confidence value $\beta$ (block 309). Furthermore, if the receiver is implementing blind detection, the receiver may need to adjust the search for the first codeword using only the set of possible vectors of modulated symbols in the set $\Psi'$ instead of $\Psi$ to account for the presence of a pilot bit b. A detailed discussion of the initialization of the input parameters is provided below. Additionally, the receiver may initialize the variables and index control variables to starting values. If the receiver is implementing an ordered algorithm, the receiver may also order the received data block (block 311).

The receiver may then evaluate backtracking, terminating, and relaxing search conditions (block 313). In general, detecting codewords from a received data block using the UGLRD may be considered to be a search through a search tree wherein the levels of the search tree are the individual received data matrices and the leaves of the search tree at a given level are the possible codewords. The receiver may initially select a test position (a level of the search tree) and then search through the possible codewords for the particular level of the search tree to find a codeword that satisfies the search conditions.

If there are no untested codewords at the given level, the receiver may evaluate for backtracking condition by searching through levels of the search tree lower than the current test position (i.e., matrices that are earlier in time) for a highest level lower than the current test position with codewords that have not been tested. If such a backtracking level exists, then the receiver may backtrack down the search tree to the backtracking level and test the untested codewords in that level. If the receiver determines that it must backtrack, the receiver may compute a new test position (level) based on its decision to backtrack and the backtracking level. The receiver then resets all previously selected codewords for all higher levels greater than that backtracking level (block 317).

If no backtracking level exists, the receiver may evaluate for terminate conditions (block 313) by determining that the search tree has been considered in its entirety (all levels and all leaves of the search tree). When this has been achieved, then the receiver may finish if a solution (a complete set of codewords one for each level in the tree (i.e., test position) has been detected) has been found.

If the terminate conditions have not been met and no solution has been found, the receiver may need to repeat the search with relaxed search constraints. The number of times search constraints may be relaxed may be limited by a stopping criterion, for example a maximum value set for the search radius $r_{max}$, a maximum duration of time allowed before the receiver would give up detecting this block of received data, or a number of consecutive times the search constraints have been relaxed without finding a solution. If the stopping criterion is met, an exit is required and the receiver may then request a re-transmission. A detailed description of the evaluation of backtracking, terminating, and relaxing search conditions is provided in the discussions of the following embodiments.

After evaluating backtracking, terminating, and relaxing search conditions, the receiver may then perform a check to determine if an exit is required (block 315). If the receiver decides that it should proceed with the search, then the MIMO receiver may compute a test position in the search tree to evaluate codewords (block 317). As discussed previously, the levels of the search tree may correspond to individual received data matrices while the leaves of the search tree may correspond to codewords to be searched. The receiver may compute the level of the search tree and reset all previously selected codewords in the higher levels in block 317.

With the test position (level in the search tree) computed in block 317, the receiver then may select the next codeword for that test position block 319. The receiver then computes a metric, such as a least square error, involving the set of all codewords selected for all the lower levels and up to this level and the corresponding received data matrices (block 321). The receiver may perform a check to determine if the metric is greater in value than an error radius (block 323). Generally, if the metric is greater than the error radius, then an invalid codeword may have been selected for the test position. However, if the metric is not greater than the error radius, then the codeword may be a valid codeword and additional testing may be performed to determine if the codeword is a best codeword for this test position.

If the metric is greater than the error radius (block 323), then the codeword is invalid and the receiver may return to block 313 to re-evaluate backtracking, terminating, and relaxing search constraints.

If the metric is not greater than the error radius (block 323), then the codeword is valid and may be the best codeword for the received data matrix. The receiver may then perform a check to determine if it has evaluated all test positions (i=P) (block 325). If the receiver has not evaluated all possible test positions (i≠P) (block 325), then the receiver may proceed to the next level of the search tree (block 329) and return to block 313 to re-evaluate backtracking, terminating, and relaxing search constraints. The receiver may then select a codeword for that new test position (block 319) and return to block 321 to compute the new value of the metric.

If the metric is not greater than the error radius (block 323) and all possible test positions (received data matrices) have been evaluated (block 325), then the codewords selected for all levels (i=1, . . . , P) are the best codewords detected for the received data block so far and the receiver may store the detected set of codewords as the best solution so far in an output XOUT (SOUT for joint block differential MIMO) (block 327). Additionally, the receiver may reduce the error radius to refine the search through the search tree, allowing only subsequent selections of codewords that are better than the codewords saved in XOUT (or SOUT) to be considered. The receiver may then return to block 313 to re-evaluate backtracking and terminating conditions to search if better solutions other than the current solution stored in XOUT (or SOUT) exists. According to an embodiment, once the error radius is reduced upon finding a solution in XOUT (or SOUT) (block 327), then block 313 may no longer execute relaxing search constraints and it will only consider evaluating backtracking and terminating conditions.

If the detecting codewords is complete (block 315), i.e. terminating conditions are met and a solution is found, then the MIMO receiver may output the solution as the set of codewords stored in XOUT (or SOUT) (block 331), the set of codewords may be processed (block 333) and receiver operations 300 may then terminate.

The UGLRD may have as input a number of parameters. Definition of input parameters includes:

$Y_B$ is the received data block as in Equation (7) which is the output of receive circuit 59 (FIG. 1a) over P transmission intervals;

P is the number of received data matrices in the received data block $Y_B$ over P transmission intervals to be processed by the UGLRD implemented in MIMO detector and multiplexer block 60;

The pilot bit(s) b is a single bit in case of real transmissions (e.g., real PAM) and two bits in case of in-phase and quadrature transmission (e.g., QAM). The pilot bit(s) are needed when considering blind MIMO detection ($\beta$=0) and assume for the following descriptions of the UGLRD that they are included in the first transmitted codeword, X[1], in each transmitted block $X_B$ of size P codewords as in Equation (11);

Nt is the number of transmit antennas;

N is the number of time slots spanned by the space-time codewords used at the transmitter (e.g. using Golden codewords, N=2=number of columns of codeword matrix X[p]) given in Equation (3);

C is the generating matrix of the space-time code used at the transmitter. In simulations presented herein, C is the Golden code generating matrix as defined previously;

U is the chosen unitary matrix to create the modified block code in Equation (11);

r is the specified search radius of the UGLRD to which the computed LSE metric will be compared. The search radius is also referred to as an error radius. Once a solution is found, r is updated to the value of the LSE given by that solution. At the beginning, r has to be selected by the user or specified by the communications system. A good choice of r depends on both the SNR and the block size P. This can be chosen by using the probability density function of the sum of the square of the noise terms affecting the system under consideration to compute the value above which most of the noise realizations can be neglected and setting r equal to that value;

$\Psi$ is the set of all possible vectors of information symbols, s, encoded in each codeword transmission. Hence, $\Psi$ contains $\Omega^K$ vectors where $\Omega$ represents the size of the constellation alphabet and K is the number of symbols in each vector.

$\Psi'=\Psi$ if $\beta\neq 0$ which implies the availability of channel information and no need for pilots bit(s). Otherwise, if $\beta$=0 no reliable channel information is available and we need to resort to blind detection. In this case, $\Psi'$ is a subset of $\Psi$ chosen to account for the knowledge of a single pilot bit per real constellation dimension to handle the scalar ambiguity issue inherent in blind detection. The dimension of the set $\Psi'$ is then $\Omega^K/2$ for real $\Omega$ and $\Omega^K/4$ for complex $\Omega$.

$I_{index}$ is the 1×P index vector which tracks the progress of the algorithm. Each entry in $I_{index}$ can take any value in the range 1: $\Omega^K$. This is in exception to the entry that corresponds to the first codeword transmission in case the algorithm resorts to blind detection which would then take values only in the range 1: $\Omega^K/2$ for real $\Omega$ and 1: $\Omega^K/4$ for complex $\Omega$. At the beginning, the algorithm is initiated with $I_{index}$ as the all zero vector.

i is a counter which indicates the entry in $I_{index}$ that is currently being searched.

$O_{index}$ is the 1×P index vector which gives the indices of the received codewords in the block $Y_B$ according to the descending order of their norm. Hence, the entries in $O_{index}$ can only take values in the range 1:P.

$X_{Oindex(i)}$ represents the $(O_{index}(i))^{th}$ codeword is the block $X_B$ which contains P codewords.

$X_{(Oindex(i))}$ represents the horizontal ordered concatenation of all the codewords in the block $X_B$ that correspond to the entries in the vector $O_{index}$ from 1:i, i.e. $X_{(Oindex(i))}$=[X[$O_{index}$(1)], X[$O_{index}$(2)], . . . , X[$O_{index}$(i)]]. Notice that if any of the entries in $O_{index}$ from 1:i is equal to 1, then the corresponding codeword in the constructed block $X_{(Oindex(i))}$ has to be pre-multiplied by the matrix U.

$X_{(Oindex(>i))}$ represents the horizontal ordered concatenation of all the codewords in the block $X_B$ that correspond to the entries in the vector $O_{index}$ from (i+1):P, i.e. $X_{(Oindex(>i))}$=[X[$O_{index}$(i+1)], X[$O_{index}$(i+2)], . . . , X[$O_{index}$(P)]]. Again, if any of the entries in $O_{index}$ from (i+1):P is equal to 1, then the corresponding codeword in the constructed block $X_{(Oindex(>i))}$ has to be pre-multiplied by the matrix U.

The metric $M_{X(Oindex(i))}$ is computed based only on the information in the corresponding filled indices according to $$M_{X(Oindex(i))} = \|Y_M - Y_M X_M^H (X_M X_M^H)^{-1} X_M\|^2 \qquad (22)$$

where $Y_M=[\beta Z, Y_{(Oindex(i))}]$ and $X_M=[\beta I, X_{(Oindex(i))}]$.

Z is the available channel information as given in Equation (4).

Figure 4:
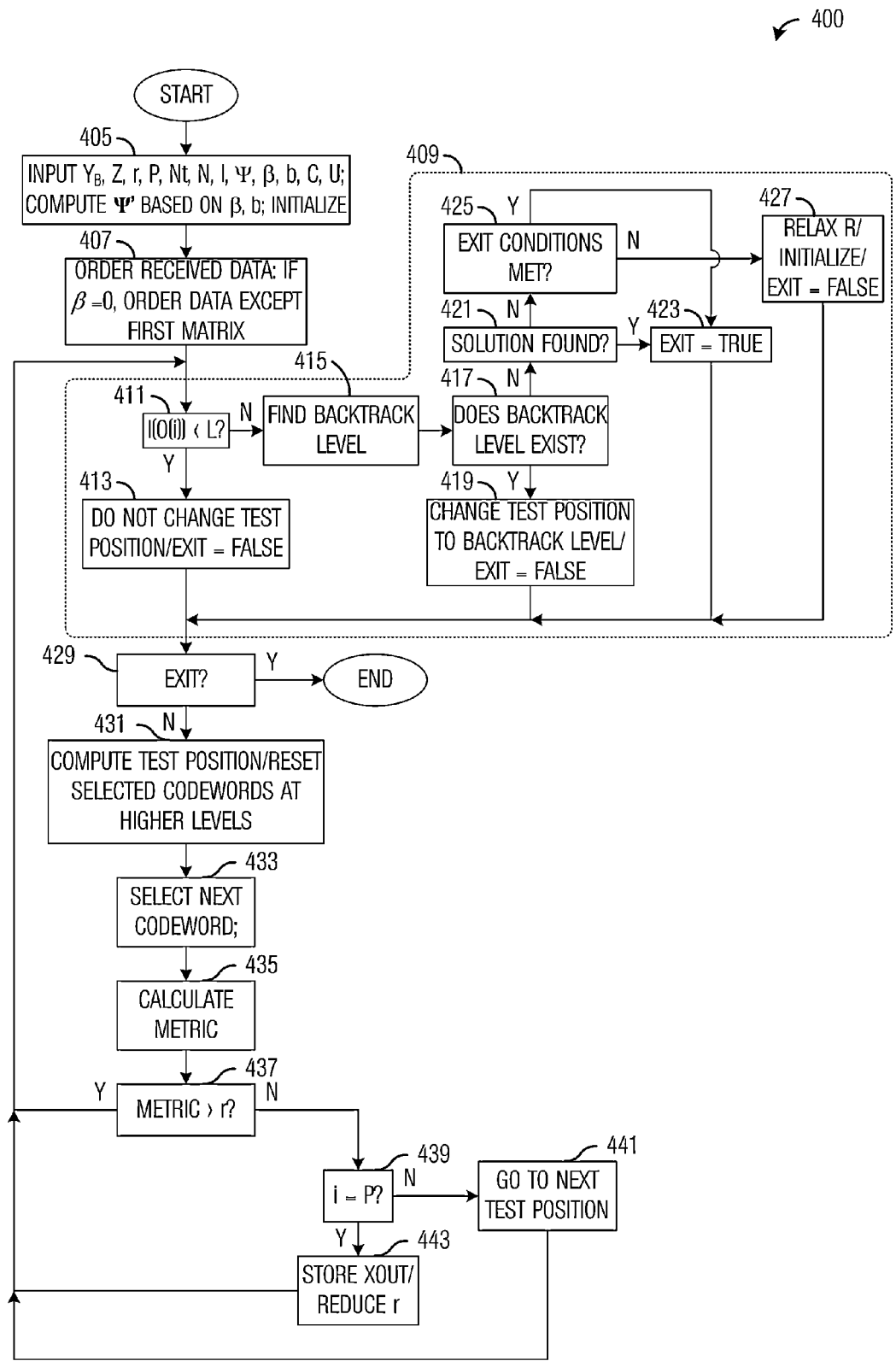
FIG. 4 is a flow diagram of receiver operations for implementing the UGLRD.

FIG. 4 illustrates a flow diagram of receiver operations 400 for implementing the UGLRD which jointly process the information from the received data block and the available channel estimate Z to detect the data as in Equation (20). When no channel estimate is available, $\beta$=0 and modified block codewords as in Equation (11) and a first received data matrix containing a pilot bit are needed for blind detection. Receiver operations 400 may also be implemented for identifiable space-time codes as in Equation (8) where the matrix U may be chosen as an identity matrix. Receiver operations 400 may be implemented in MIMO detector and multiplexer block 60 of a receiver. Receiver operations 400 may be used to implement coherent ML detection, blind detection, differential detection or detection based on joint processing of the information from both the received data and the available channel estimate based on the value of the confidence value β and input values provided to receiver operations 400. Receiver operations 400 may be an implementation of FIG. 2.

Receiver operations 400 may begin with the receiver (MIMO detector and multiplexer block 60) receiving as input parameters (block 405). The input parameters may include: $Y_B$, Z, r, P, Nt, N, I, Ψ, β, b, C, and U. Additionally, the MIMO receiver may compute Ψ' (subset of that accounts for pilot bit (b) knowledge and the confidence value β) as well as initialize variables and index control variables to starting values. For example, if β≠0 which implies the availability of reliable channel information and no need for pilots bit(s), Ψ'=Ψ and joint processing of Z and $Y_B$ as in Equation (20) may be used. If β=0, no reliable channel information is available and the UGLRD may need to resort to blind detection.

After receiving the input values and computing Ψ', the receiver may order the received data block $Y_B$ (block 407). As discussed previously, the receiver may order the received data block $Y_B$ in descending order based on a Frobenius norm of the individual received codewords. If β=0, then ordering of the received data block is performed with the exception of Y[1], the received data matrix containing the pilot bit b. An index to the ordered received data block may be saved as vector O, which, with exception of the first entry comprises the indices of the ordered received data block. The first entry may store an index to the received data matrix containing the pilot bit b, i.e., numeral one (1). For example, vector O=[1 $\overline{O}$], where $\overline{O}$ is an index to the ordered received data block excluding the first received data matrix Y[1] that contains the pilot information.

The receiver may then evaluate backtracking, terminating, and relaxing search conditions (block 409). The receiver may evaluate backtracking, terminating, and relaxing search conditions by checking to see if it has tested all codewords on a level (test position) of the search tree (I(O(i))=L) specified by O(i) (block 411) where L is the number of possible vectors included in the set Ψ. If β=0 and the receiver is considering the first test position, i.e., O(i)=1, then L would correspond to the number of vectors in the set Ψ' instead to account for the knowledge of the pilot bit in the first received data matrix. If the receiver has not tested all codewords on the level of the search tree specified by O(i), i.e., (I(O))<L) in block 411, then no backtracking is required and the test position should not be changed (block 413). The evaluating backtracking, terminating, and relaxing search conditions may be complete and detecting codewords is not complete (Exit=FALSE) and receiver operations 400 may proceed.

If the receiver has tested all codewords on a level of the search tree specified by O(i), i.e., (I(O))=L) in block 411, then the receiver may perform an additional check to determine if there are any untested codewords on levels of the search tree lower than the current level O(i) (block 415). The check may determine if there are any untested codewords in the search tree may involve checking to determine if I(O(i))<L for each possible level of the search tree specified by the first (i−1) entries in the vector O. Preferably, the check may start with the highest level (test position) smaller than the current test position, i.e., O(i−1) and proceed sequentially to lower levels until a level with untested codeword(s) is found or all test positions checked.

If there are untested codewords (implying that a backtrack level exists) (block 417), then the receiver may backtrack to a highest level of the search tree that has untested codewords and is lower than the current position given by O(i) (which corresponds to a last entry in the first (i−1) entries in the vector O that has untested codewords) i.e., the backtrack level) (block 419). Receiver operations 400 may continue.

If there are no untested codewords, i.e., no backtrack level exists (block 417), then the receiver may check to determine if detecting codewords is complete and a set of codewords corresponding to the received data block has been found, i.e., a solution (XOUT) has been found (block 421). The receiver may determine if the detecting codewords is complete by checking an output XOUT. If the output XOUT is empty then a solution has not been found, while if the output XOUT is not empty then a solution has been found and a set of detected codewords corresponding to the received data block has been detected in XOUT. If a solution has been found (block 421), then the terminating conditions are met and evaluating backtracking, terminating, and relaxing search conditions may be complete and detecting codewords is complete (Exit=TRUE) (block 423) and receiver operations 400 may then terminate.

If no backtrack level exists (block 417) and if detecting codewords has failed (no solution has been found) (block 421), then the receiver may decide to give up detecting the set of codewords corresponding to this block of received data if exit conditions are met (block 425). Exit conditions may include not being able to find a solution after several (potentially user or system specified) consecutive relaxations of the error radius r, after a certain allowable time period limitation, or if the error radius is relaxed beyond a maximum value (block 425). The receiver may determine that the received data block is undetectable, then Exit=TRUE (block 423) and receiver operations 400 may then terminate. A re-transmit request may be issued by the receiver to a source of the received data block to request that the data block be re-transmitted.

If no backtrack level exists (block 417), no detected set of codewords (solution) has been found (block 421), and exit conditions are not met (block 425), then the receiver may need to relax an error radius r to loosen the search criteria (block 427). For example, the receiver may double the size of the error radius r. Additionally, the receiver may reset variables, such as the index variable i and the index vector I. The receiver may also need to re-initialize some state variables used to keep track of the progress of the search. Then the evaluating backtracking, terminating, and relaxing search conditions may be complete and detecting codewords is not complete (Exit=FALSE).

After evaluating backtracking, terminating, and relaxing search conditions, the receiver may then perform a check to determine if an exit is required (block 429). If the receiver decides that it should proceed with the search, then the receiver may compute a test position in the search tree to evaluate codewords (block 431). As discussed previously, the levels of the search tree may correspond to individual received data matrices while the leaves of the search tree may correspond to codewords to be searched. The receiver may compute the level of the search tree and reset all previously selected codewords in levels higher than the computed test position (level) of the search tree in block 431, i.e., reset codewords previously selected for the levels specified by the last (P−i) entries in the vector O.

With the test position computed (in block 431), the receiver selects the next codeword for that test position using the possible set of vectors in the set Ψ (block 433). If β=0 and O(i)=1, i.e., the test position corresponding to the first received data matrix in the block is being evaluated, then the codeword is selected based on the set of possible symbol vectors in the set Ψ' rather than Ψ. After selecting a codeword for the given test position (level) in block 433, the receiver may compute a metric in block 435, such as a least square error metric in Equation (22), involving the set of all codewords selected for all the lower levels and up to this level and the corresponding received data matrices. The receiver then performs a check to determine if the metric is greater in value than the error radius (block 437). Generally, if the metric is greater than the error radius, then an invalid codeword may have been selected for the test position. However, if the metric is not greater than the error radius, then the codeword may be a valid codeword and additional testing may be performed to determine if the codeword is a best codeword for this test position.

If the metric is greater than the error radius (block 437), then the codeword is invalid and the receiver may return to block 409 to re-evaluate backtracking, terminating, and relaxing search constraints.

If the metric is not greater than the error radius (block 437), then the codeword is valid and may be the best codeword for the received data matrix. The receiver may then perform a check to determine if it has evaluated all test positions (i=P) (block 439). If the receiver has not evaluated all possible test positions (i≠P) (block 439), then the receiver may proceed to the next level of the search tree, i.e., O(i+1) (block 441) and return to block 409 to re-evaluate backtracking, terminating, and relaxing search constraints.

If the metric is not greater than the error radius (block 437) and if all possible test positions (corresponding to all received data matrices in a block) have been evaluated (block 439), then the codewords selected for all levels (i=1, . . . ,P) are the best codewords detected for the received data block so far and the receiver may store the detected set of codewords as the best solution so far in an output XOUT (block 443). Additionally, the receiver may reduce the error radius to refine the search through the search tree, allowing only subsequent selections of codewords that are better than the codewords saved in XOUT to be considered. The receiver may then return to block 409 to re-evaluate backtracking and terminating conditions to search if better solutions other than the current solution stored in XOUT exists. Once the error radius is reduced upon finding a solution in XOUT, then block 409 may no longer execute relaxing search constraints and it will only consider evaluating backtracking and terminating conditions.

If the detecting codewords is complete (block 429), i.e., terminating conditions are met and a solution is found, then receiver operations 400 may then terminate.

As the size of the data blocks get bigger, the computational requirements may grow rapidly, thereby requiring a receiver with a significant level of computational capability or restriction in data block size. However, it may be possible to suffer a small amount of detection performance to simplify data block detection.

Figure 5:
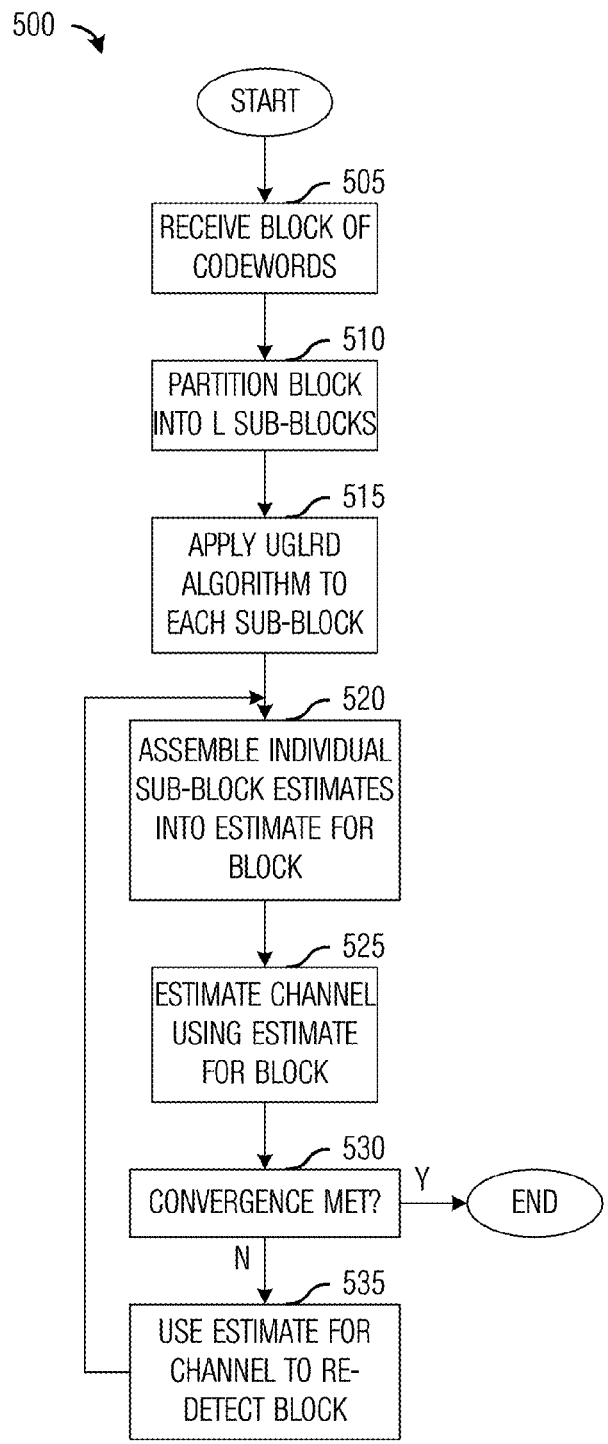
FIG. 5 is a flow diagram of receiver operations in detecting large data blocks using a sub-optimal technique based on the UGLRD that reduces computational requirements at the expense of reduced detection performance.

FIG. 5 illustrates a flow diagram of receiver operations 500 in detecting large data blocks using a sub-optimal technique that reduces computational requirements at the expense of reduced detection performance. Receiver operations 500 may be indicative of operations occurring in a receiver, such as receiver 12, as the receiver detects a received data block. Receiver operations 500 may occur while the receiver is in a normal operating mode, especially when the receiver is receiving large data blocks. As an example, receiver operations 500 may be used in receiver operations 200 to reduce computational requirements.

Receiver operations 500 may begin with the receiver receiving a data block (block 505). According to an embodiment, the data block may be of size LP codewords, where L and P are positive integer values. The data block may be divided into L sub-blocks of P codewords each (block 510). Although the discussion focuses on the division of the data block into equal size sub-blocks, it may be possible to divide the data block into sub-blocks of different sizes. As an example, the data block may be divided into L−1 sub-blocks of a first size and one sub-block of a second size.

The UGLRD may be applied to each of the L sub-blocks to detect the data in the sub-blocks (block 515). According to an embodiment, the application of the UGLRD may be performed sequentially. Alternatively, the application of the UGLRD may be applied in parallel or partially in parallel and in sequence. Let the independently detected sub-blocks be denoted $\hat{X}_{B_l}$, where $\hat{X}_{B_l}$ represents the detected data for sub-block l.

The independently detected sub-blocks may be reassembled into an estimate $\hat{\underline{X}}_B$ for the data block (block 520). The estimate $\hat{\underline{X}}_B$ for the data block may be expressed as $$\hat{\underline{X}}_B = [\hat{X}_{B_1}, \hat{X}_{B_2}, \ldots, \hat{X}_{BL}]. \tag{23}$$

The estimate $\hat{\underline{X}}_B$ for the data block may be used to estimate the channel $\hat{H}$, wherein the estimate $\hat{H}$ for the channel may be expressed as $$\hat{H} = \underline{Y}_B \hat{\underline{X}}_B^H (\hat{\underline{X}}_B \hat{\underline{X}}_B^H)^{-1}, \tag{24}$$

where $\underline{Y}_B$ is the received data for the entire block of size LP codewords (block 525).

The detected codewords may again be reassembled into the data block $\hat{\underline{X}}_B$, followed by re-estimating the channel and re-detecting the codeword by returning to block 520. The repeating of the estimation and the detection may be repeated until a convergence criterion is met (block 530). For example, the convergence criterion may be $\|\hat{H}_{new} - \underline{H}_{old}\| < \epsilon$ where $\epsilon$ is a user selected threshold. If the convergence criterion is met, then receiver operations 500 may then terminate.

If the convergence criterion is not met, then it may be necessary to re-detect the block (block 535). According to an embodiment, the channel estimate $\hat{H}$ may then be used to re-detect the transmitted bits for one of the codewords in the data block at a time according to $$\hat{X}[p] = \underset{\{X_i\}}{\operatorname{argmin}} \|Y[p] - \hat{H} X_i\|^2, \tag{25}$$

for p=1, . . . , LP. According to an embodiment, the search (the re-detection) of the transmitted bits may be performed efficiently using sphere decoding. The receiver may then return to block 520 to re-estimate the channel.

Figure 6:
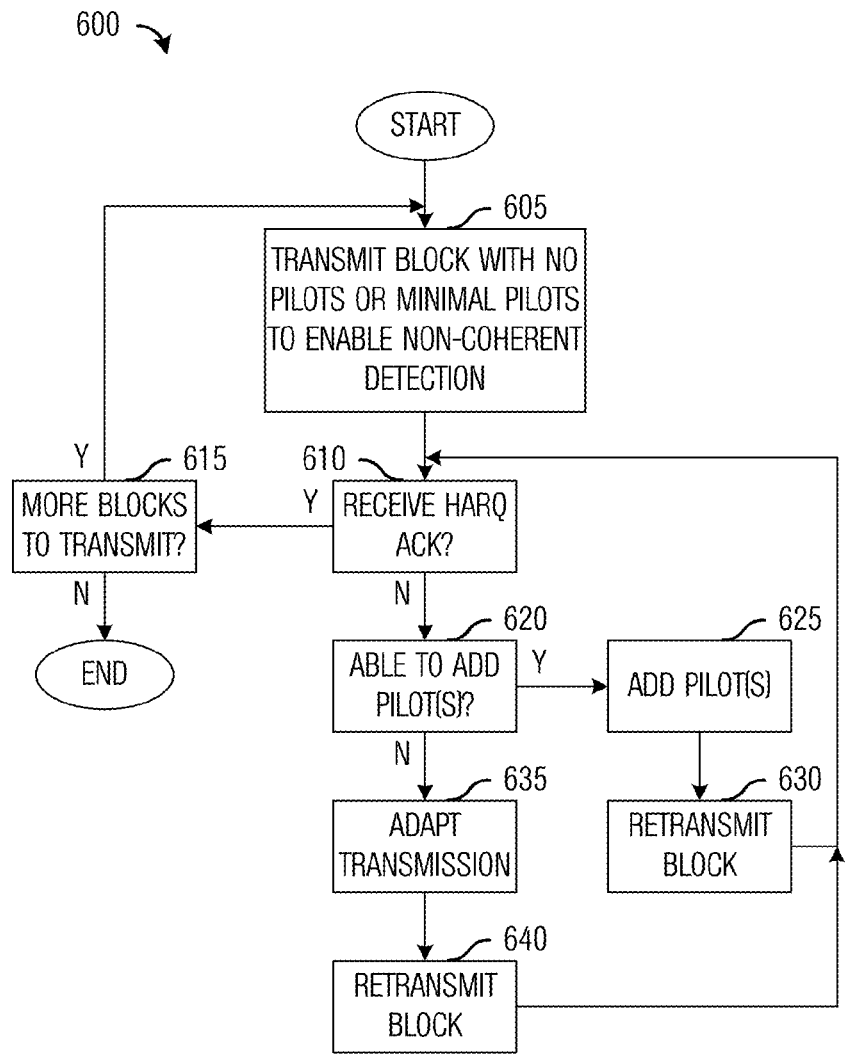
FIG. 6 is a flow diagram of transmitter operations for transmitting information to a receiver, wherein the receiver makes use of a UGLRD and is capable of using coherent detector or blind detection, as well as hybrid automatic repeat requested (HARD) operation.

FIG. 6 illustrates a flow diagram of transmitter operations 600 for transmitting information to a receiver, wherein the receiver makes use of a UGLRD and is capable of using several detection schemes including coherent ML detection, blind detection, differential detection, or detection based on joint processing of received data and a measured channel estimate, as well as hybrid automatic repeat requested (HARM) operation. Transmitter operations 600 may be indicative of operations taking place in a transmitter, such as transmitter 11, as the transmitter has data to transmit to a receiver that is using the UGLRD as well as HARQ operation. The transmitter may be capable of making use of HARQ positive acknowledgements (ACKs) and negative acknowledgements (NACKs) received from the receiver to adjust its transmissions to help the receiver detect the data block(s) transmitted by the transmitter. Transmitter operations 600 may occur while the transmitter has data to transmit to the transmitter and while the transmitter is in a normal operating mode.

Transmitter operations 600 may begin with the transmitter transmitting a data block to the receiver, (block 605). According to an embodiment, the data block may be transmitted without any pilots. According to an alternative embodiment, the data block may be transmitted with minimal pilots (pilot sequences) to enable non-coherent detection, e.g., if a channel estimate for a channel between the transmitter and the receiver is not available at the receiver, then the data block may contain a pilot bit per constellation dimension to enable the receiver to perform completely bind detection.

After transmitting the data block, the transmitter may perform a check to determine if it has received a HARQ positive acknowledgement (an ACK) from the receiver (block 610). If the transmitter received an ACK, then the receiver has successfully detected and decoded the data block. The transmitter may then check to determine if there are more data blocks to transmit (block 615). If there are more data blocks to transmit, then the transmitter may return to block 605 to transmit an additional data block. According to an embodiment, the additional data block may also be transmitted with no pilots or with minimal pilots, i.e., the same way as the data block was transmitted. If there are no more data blocks to transmit, then transmitter operations 600 may then terminate.

If the transmitter has not received an ACK or if the transmitter receives a negative ACK (NACK), then the transmitter may perform a check to determine if it can add one or more additional pilots to the data block (block 620). According to an embodiment, a data block may be able to support a maximum number of pilots and the check may be used to determine if the data block is already carrying the maximum number of pilots. If the data block may carry additional pilot(s), then the transmitter may add one or more pilots (up to the maximum number pilots or a maximum number of pilots to be added in a single re-transmission) to the data block (block 625) and re-transmit the data block (block 630). The transmitter may return to block 610 to wait for a HARQ acknowledgement.

If the transmitter cannot add any additional pilots to the data block (block 620), then the transmitter may adapt the transmission (block 635). According to an embodiment, adapting the transmission may include adjusting a modulation and coding scheme (MCS), adjusting a transmit power level, and so forth. The transmitter may then re-transmit the data block (640). The transmitter may return to block 610 to wait for a HARQ acknowledgement.

According to an embodiment, once the limit of pilots has been reached for the data block (along with other possible adjustments, such as MCS, transmit power, and so forth), a counter or timer mechanism may be used by the transmitter to prevent the continued retransmission of the data block. For example, after a specified number of retries has been attempted by the transmitter, the transmission of the data block may be marked as a failure. The transmitter may schedule a re-transmission of the data block at a later time or simply give up on its attempts in transmitting the data block.

According to an alternative embodiment, a counter or timer may be used from an initial transmission of the data block to limit a number of re-transmission attempts for a data block. For example, after a specified number of retries has been attempted by the transmitter, the transmission of the data block may be marked as a failure. The transmitter may schedule a re-transmission of the data block at a later time or simply give up on its attempts in transmitting the data block.

According to an embodiment, transmitter operations 600 may be repeated for each data block transmitted by the transmitter to the receiver. By repeating transmitter operations 600, each individual transmission may be adapted to current channel conditions.

According to an alternative embodiment, once a data block is successfully received by the receiver, subsequent data blocks sent to the receiver may be initially sent with an equal number of pilots (if any). For example, if a first data block is sent to the receiver after two re-tries, meaning that two NACKs where received by the transmitter, then at least two pilots were added to the data block. Then subsequent data blocks transmitted by the transmitter to the receiver may include two pilots on their initial transmission attempts. By using the equal number of pilots, a number of unsuccessful transmission attempts may be reduced, thereby reducing communications overhead.

A timer may be used to eliminate stale information in situations when an extended amount of time elapses between successive data block transmissions, since channel conditions have likely changed. For example, if a first data block required two re-tries (and hence, at least two pilots), then a next data block to be transmitted may be transmitted with at least two pilots unless sufficient time has elapsed between the transmission of the first data block and the next data block to reduce a confidence in the requirement of the at least two pilots to ensure successful detection of the data block. If the elapsed time between successive data blocks exceeds the timer, then the next data block may be transmitted with fewer pilots and transmitter operations 600 may be repeated in its entirety.

Evaluation of UGLRD performance in a 2×2 MIMO communications system with a fixed channel matrix H whose elements are picked from a zero mean unit variance complex Gaussian distribution. Available channel knowledge is represented by Z according to Equation (4). The elements of W are generated independently from a zero mean complex Gaussian distribution with variance $\sigma_h^2$. Each codeword may be a 2×2 matrix obtained using the Golden code with 4 binary phase-shift keying (BPSK) symbols. A set of LP=12 codewords are generated for each channel scenario. A modified Golden code as shown in Equation (11) is used for a first codeword of each block and is pre-multiplied by a 20 degree 2×2 rotation matrix U in order to address the identifiability issue in case blind detection is required. Received data is obtained by multiplying the transmitted data block by the channel matrix H and adding measurement noise.

The evaluation process is repeated for 300000 channel scenarios and an average bit error rate (BER) is computed. Evaluation is also performed for a coherent ML detector with perfect channel state information (CSI) at the receiver for use as reference. Sphere decoding is used for results involving coherent detection, while the UGLRD is implemented using the techniques describe above.

Figure 7A:
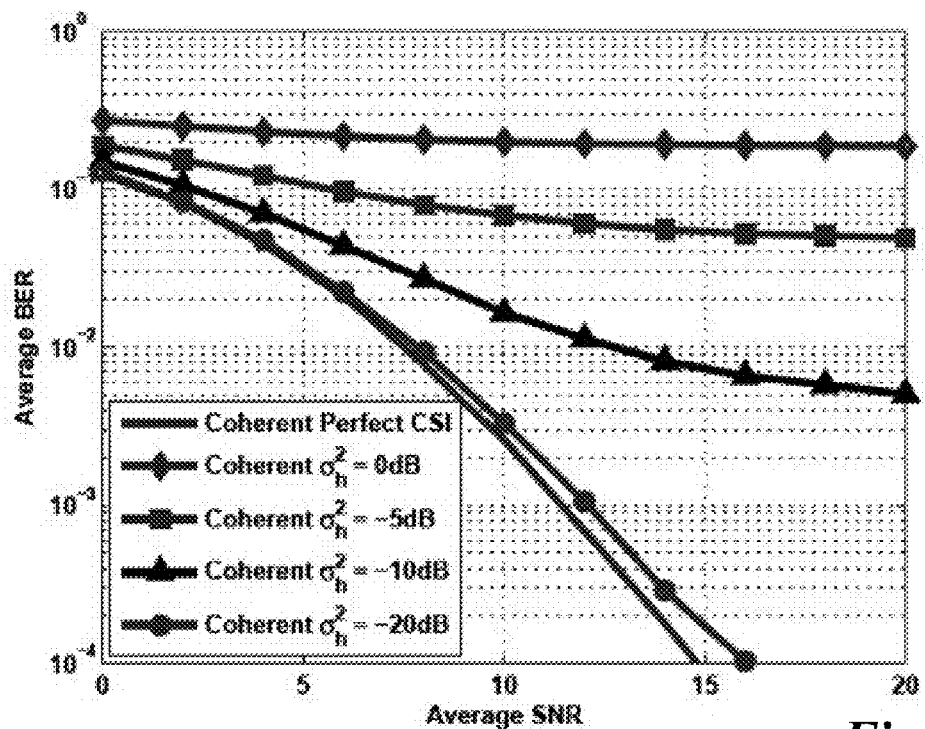
FIG. 7a is a plot of average SNR vs average BER for different values of channel estimation error.

FIG. 7*a* illustrates a plot of average SNR vs average BER for different values of channel estimation error. The degradation in performance incurred by the mismatched ML coherent detector for different values of channel estimation error $\sigma_h^2$ is shown in FIG. 7*a*. As the channel estimation error $\sigma_h^2$ increases, the floor level in the BER curve increases.

Figure 7B:
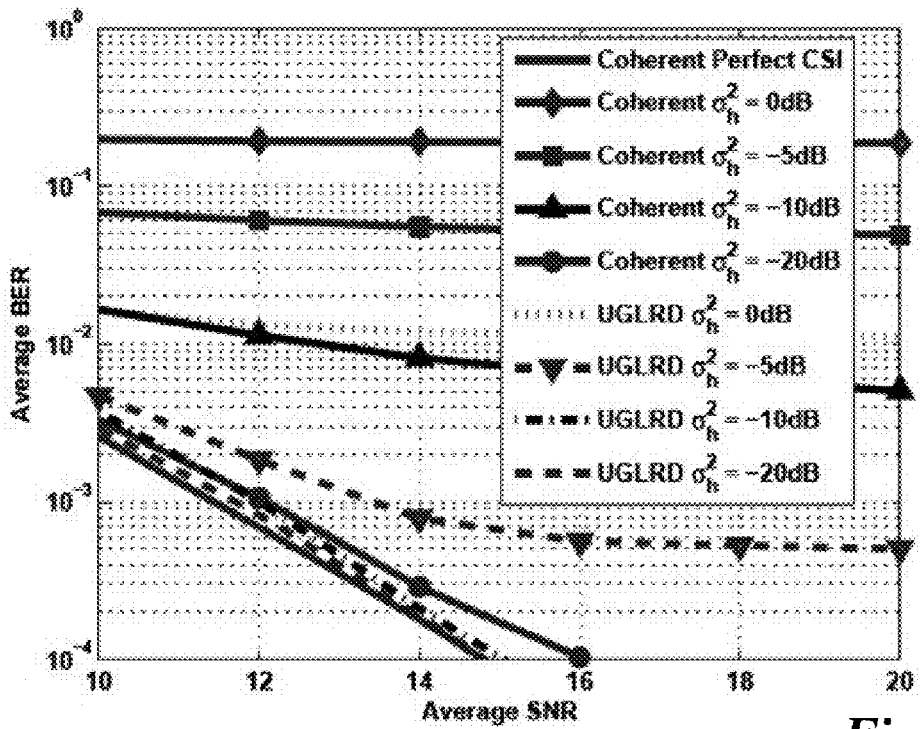
FIG. 7b is a plot of average SNR vs average BER for different values of channel estimation error, comparing coherent detection and the UGLRD.

FIG. 7*b* illustrates a plot of average SNR vs average BER for different values of channel estimation error, comparing coherent detection and the UGLRD. Optimal UGLRD performance is shown in FIG. 7*b*, i.e., complete processing of a data block is performed without partitioning the data block into sub-blocks. As shown in FIG. 7*b*, the UGLRD outperforms the conventional mismatched ML coherent detection for all values of $\sigma_h^2$. Recall that the UGLRD may be able to resort to blind detection if the floor of the BER curve is unacceptable.

Figure 7C:
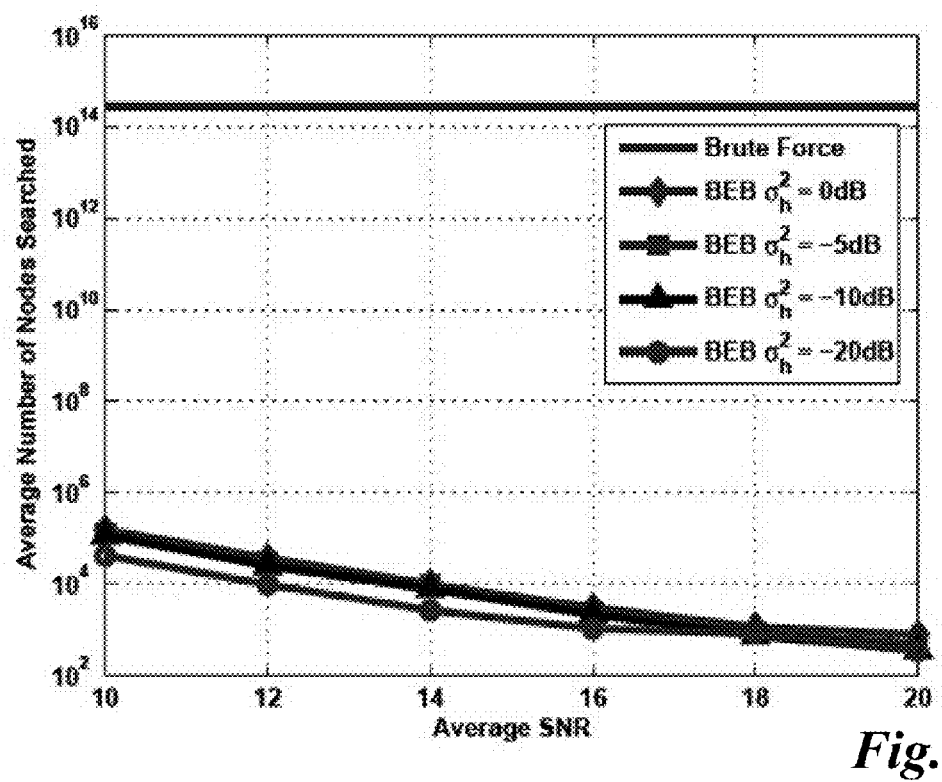
FIG. 7c is a plot of computational complexity for different UGLRD implementations.

FIG. 7*c* illustrates a plot of computational complexity for different UGLRD implementations. Significant computational complexity savings may be achieved when using the BEB-based version of the UGLRD as presented herein as opposed to a brute force version of the UGLRD without incurring performance penalties.

Figure 7D:
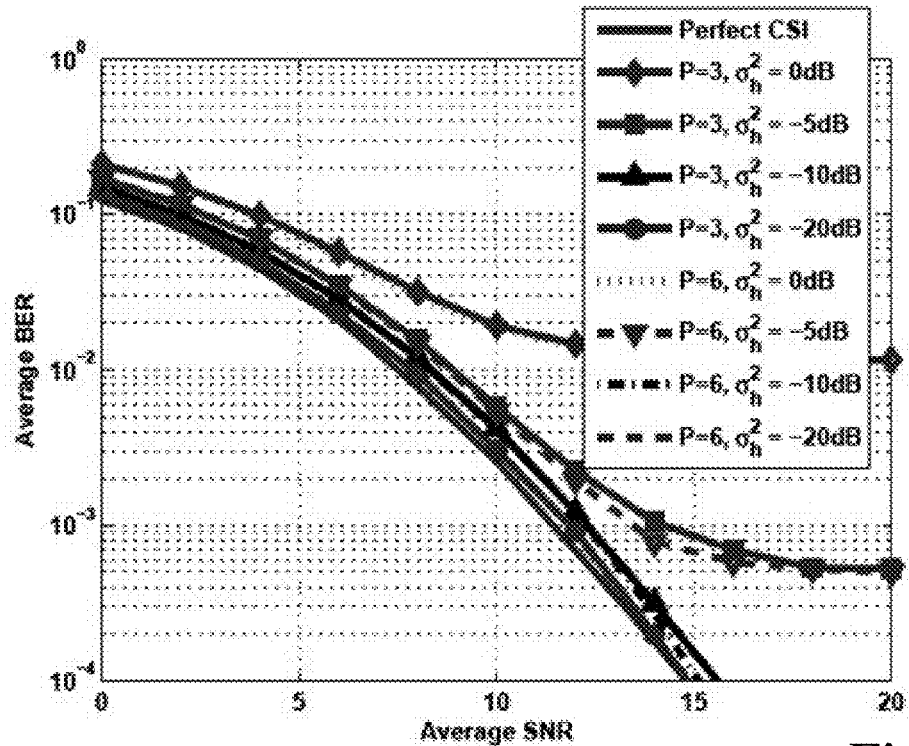
FIG. 7d is a plot of average SNR vs average BER for the sub-optimal version of the UGLRD wherein a data block is partitioned into sub-blocks.

FIG. 7d illustrates a plot of average SNR vs average BER for the sub-optimal version of the UGLRD wherein a data block is partitioned into sub-blocks. The performance of the sub-optimal version of the UGLRD is shown in FIG. 7d, wherein a data block is partitioned into a number of sub-blocks of different sizes (P=3 and 6). As shown in FIG. 7d, better performance is realized for larger sub-blocks.

Figure 7E:
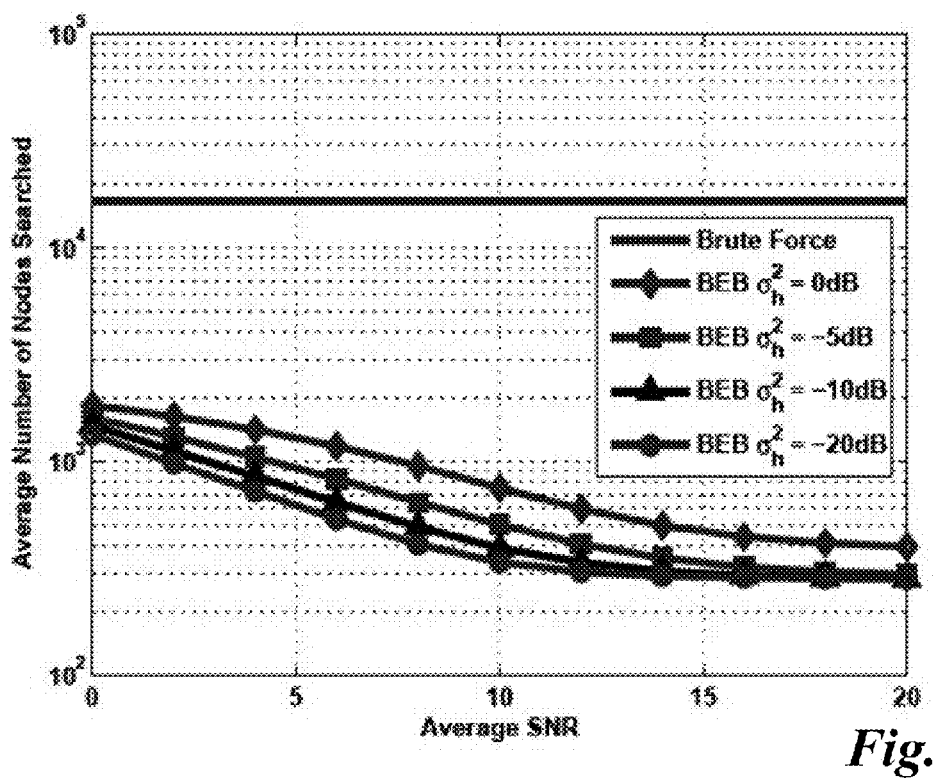
FIG. 7e is a plot of computational complexity for the sub-optimal version of the UGLRD wherein a data block is partitioned into sub-blocks of size P=3.
Figure 7F:
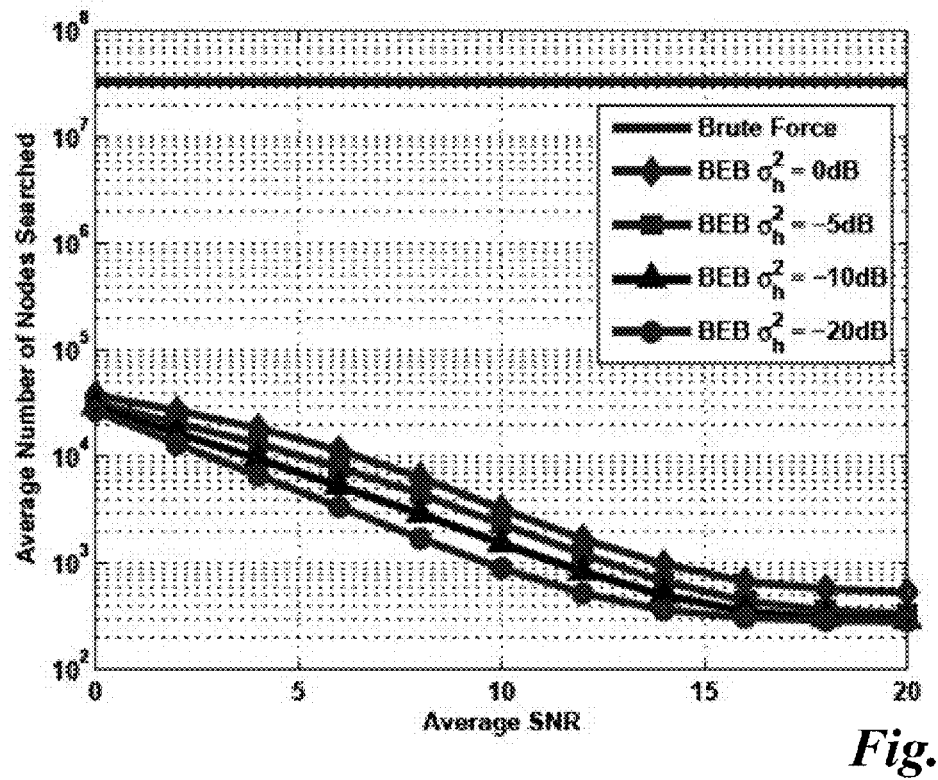
FIG. 7f is a plot of computational complexity for the sub-optimal version of the UGLRD wherein a data block is partitioned into sub-blocks of size P=6.

FIG. 7e illustrates a plot of computational complexity for the sub-optimal version of the UGLRD wherein a data block is partitioned into sub-blocks of size P=3. FIG. 7f illustrates a plot of computational complexity for the sub-optimal version of the UGLRD wherein a data block is partitioned into sub-blocks of size P=6. As expected, larger sub-blocks incur a greater computational cost.

Figure 7G:
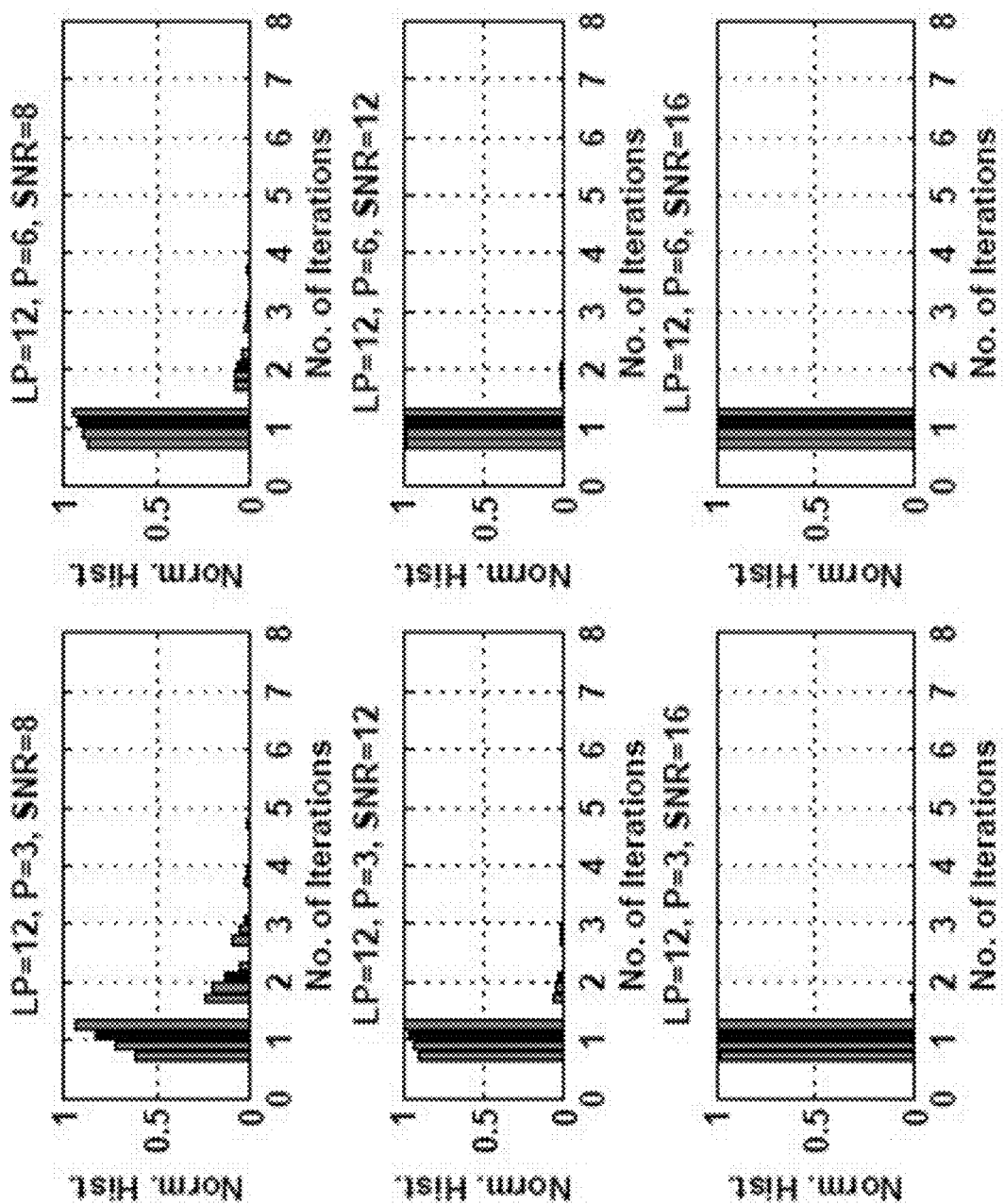
FIG. 7g are plots of normalized histograms of a number of iterations performed following initial data detection until a convergence criterion is achieved for several different SNR values.
Figure 8A:
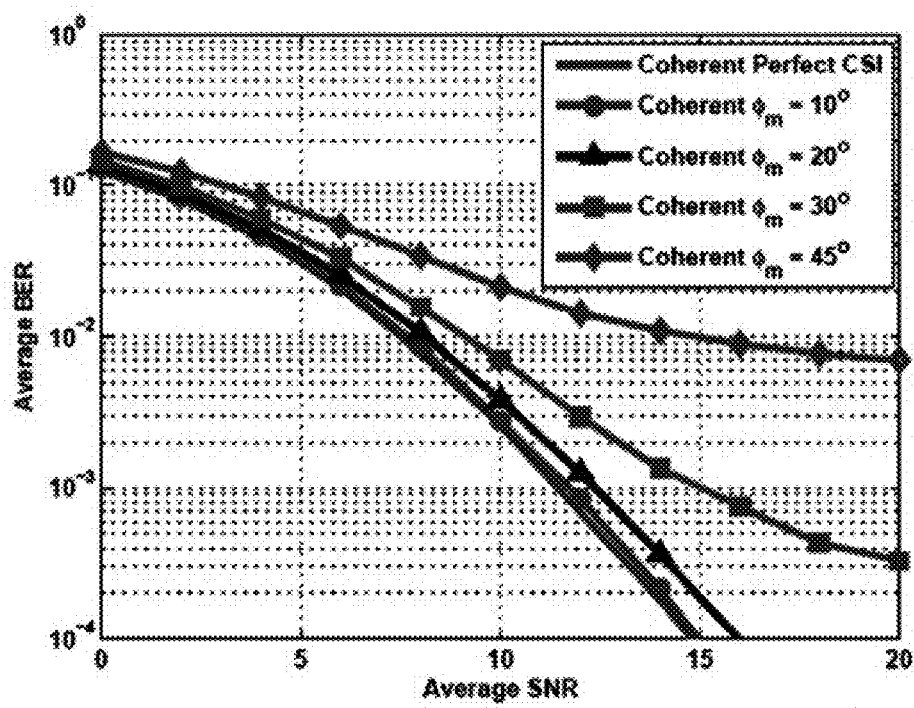
FIGS. 8a through 8g are plots similar to FIGS. 7a through 7g for a different model regarding available channel knowledge.
Figure 8B:
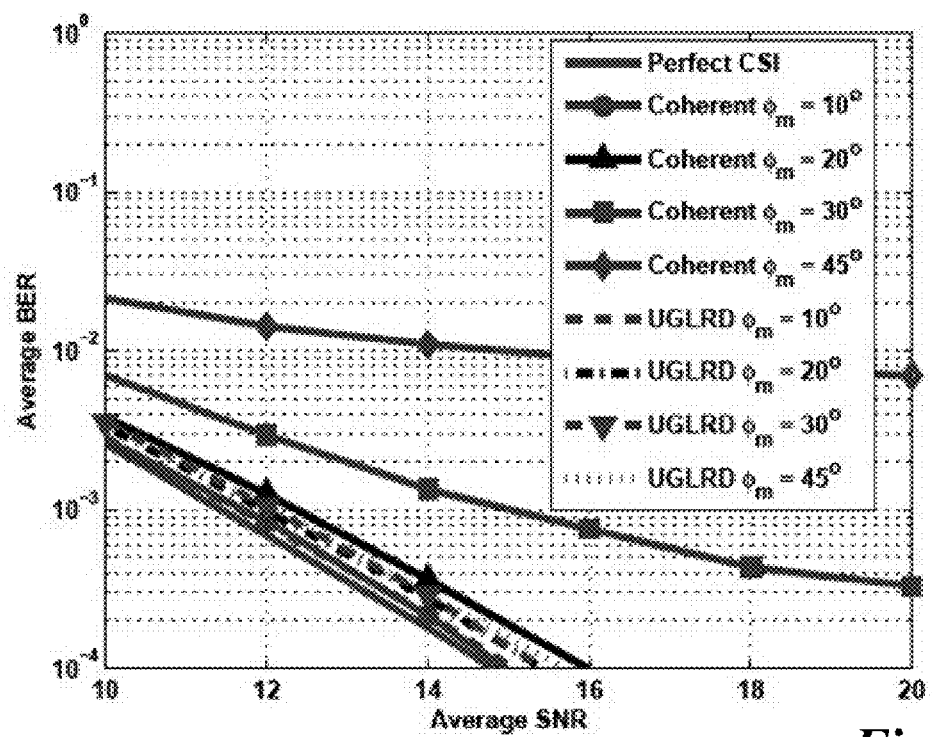
Figure 8C:
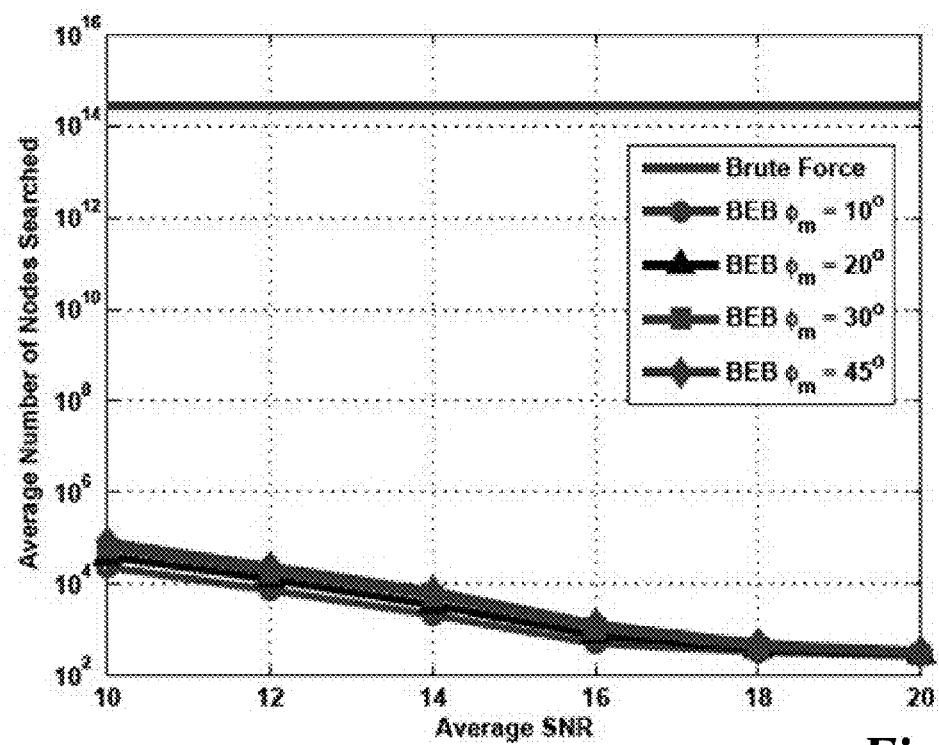
Figure 8D:
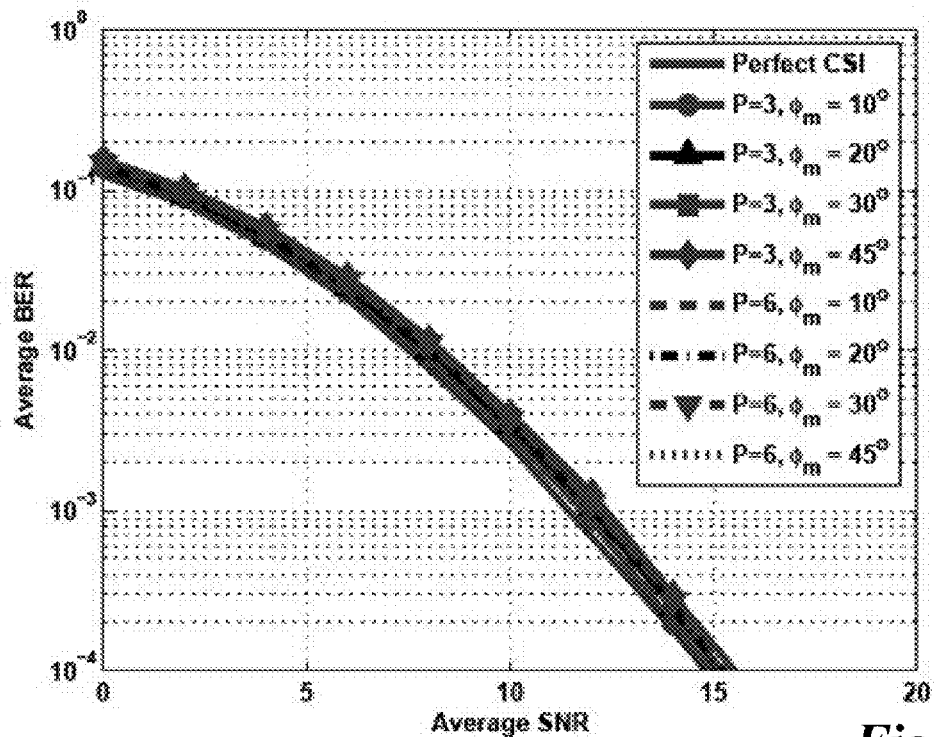
Figure 8E:
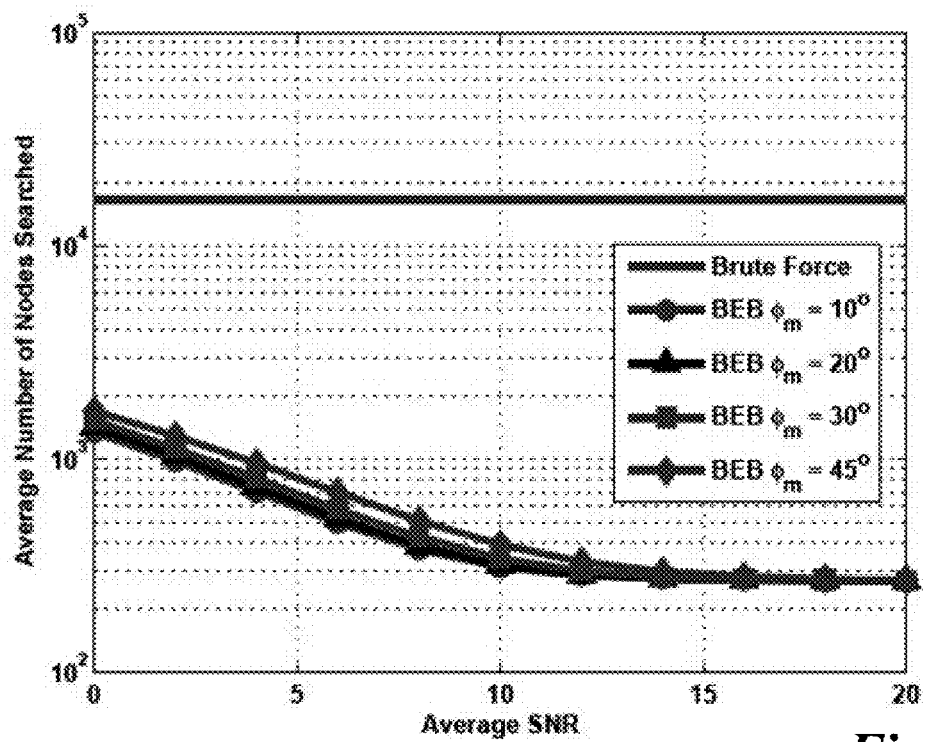
Figure 8F:
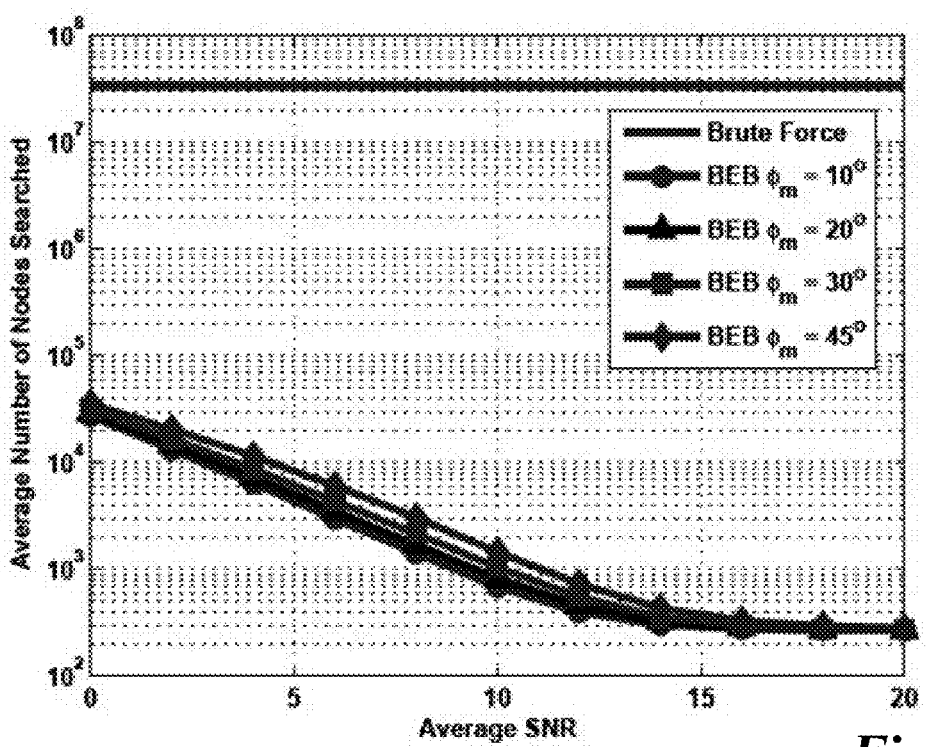
Figure 8G:
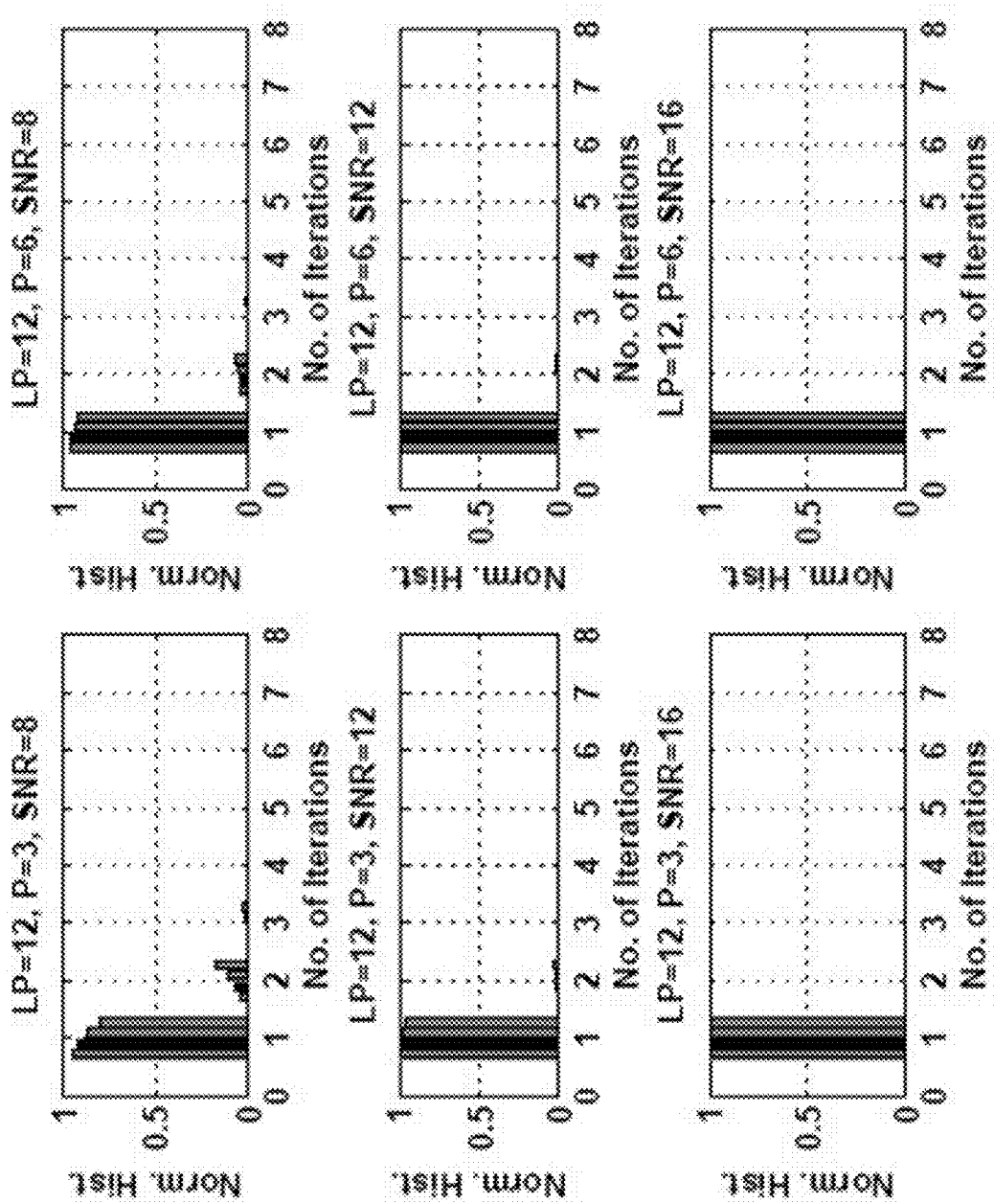

FIG. 7g illustrate plots of normalized histograms of a number of iterations performed following initial data detection until a convergence criterion is achieved for several different SNR values. The plots correspond to sub-blocks of size P=3 and 6, respectively.

FIGS. 8a through 8g illustrate similar results as those shown in FIGS. 7a through 7g, but with a different model regarding available channel knowledge Z. The model for available channel knowledge Z may be expressed as $$Z = H \bullet \Phi, \quad (26)$$

where $\bullet$ represents the Hadamard product and $\Phi$ is the change in phase of the channel coefficients between subsequent transmissions given by $$\Phi = \begin{bmatrix} e^{-j\phi_{11}} & e^{-j\phi_{12}} \\ e^{-j\phi_{21}} & e^{-j\phi_{22}} \end{bmatrix}, \quad (27)$$

with $\phi_{11}$, $\phi_{12}$, $\phi_{21}$, and $\phi_{22}$ being independent and identically uniformly distributed on the closed interval $[-\phi_m, \phi_m]$. In other words, the model assumes perfect channel estimation from a previous transmission and considers the error in the form of a random phase change encountered by the channel coefficients between the previous transmission and the current transmission.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for receiver operations, the method comprising:
   receiving a data block;
   determining if there is information related to a channel, wherein the data block is received over the channel;
   if there is no information related to the channel, detecting data in the data block with a first detector; and
   if there is information related to the channel,
      determining if there is confidence in the information related to the channel,
      detecting data in the data block with a second detector if there is confidence in the information,
      detecting the data in the data block with the first detector if there is no confidence in the information, wherein the first detector uses a different detection technique than the second detector, and
      detecting the data in the data block with a joint detector in response to determining that there is partial confidence in the information, wherein the joint detector makes use of a second detector in conjunction with the information.

2. The method of claim 1, wherein the information comprises a channel estimate.

3. The method of claim 1, wherein the information comprises a channel estimate, and wherein determining if there is confidence in information related to a channel comprises:
   computing a confidence value based on an error variance of the channel estimate;
   determining that there is confidence in the information if the confidence value is greater than or equal to a threshold; and
   determining that there is no confidence in the information if the confidence value is less than the threshold.

4. The method of claim 1, wherein determining that there is partial confidence in the information comprises determining that the confidence value is greater than a first threshold but less than a second threshold.

5. The method of claim 4, wherein determining if there is confidence in the information related to the channel comprises:
   determining that there is no confidence in the information if the confidence value is less than the first threshold; and
   determining that there is confidence in the information if the confidence value is greater than the second threshold.

6. The method of claim 1, wherein the information comprises a channel estimate, and wherein determining if there is confidence in information related to a channel comprises:
   retrieving a confidence value based on an error level of the channel estimate;
   determining that there is confidence in the information if the confidence value is greater than or equal to a threshold; and
   determining that there is no confidence in the information if the confidence value is less than the threshold.

7. The method of claim 1, wherein the second detector comprises a maximum likelihood detector.

8. The method of claim 1, wherein the first detector comprises a blind detection detector or a differential detector.

9. A method for receiver operations, the method comprising:
   receiving a data block;
   determining if there is information related to a channel, wherein the data block is received over the channel;
   if there is no information related to the channel, detecting data in the data block with a first detector; and if there is information related to the channel,
  determining if there is confidence in the information related to the channel,
  detecting data in the data block with a second detector if there is confidence in the information,
  detecting the data in the data block with the first detector if there is no confidence in the information, wherein the first detector uses a different detection technique than the second detector, wherein the information comprises a channel estimate, and
wherein determining if there is confidence in information related to a channel comprises:
  computing a confidence value based on an error variance of the channel estimate;
  determining that there is confidence in the information if the confidence value is greater than or equal to a threshold; and
  determining that there is no confidence in the information if the confidence value is less than the threshold, wherein the confidence value is computed as $$\beta = \sigma/\sigma_h,$$

where $\beta$ is the confidence value, $\sigma$ is a standard deviation of noise elements of V, V is an N×N matrix whose elements represent additive noise terms at each receive antenna at each time slot, $\sigma_h$ is a standard deviation of elements of W, and W is an error term affecting the channel estimate.

10. A method for receiver operations, the method comprising:
  receiving a data block over a channel;
  if there is no information related to the channel, detecting data in the data block with a first detector; and
  if there is information related to the channel,
    determining if there is confidence in the information related to the channel,
    detecting data in the data block with a second detector if there is confidence in the information, and
    detecting the data in the data block with the first detector if there is no confidence in the information,
    wherein the first detector uses a different detection technique than the second detector,
    wherein the data block is partitioned into a plurality of sub-blocks, and
    wherein detecting data in the data block with a first detector or detecting the data in the data block with the first detector in response to determining that there is no confidence in the information comprises detecting data in each sub-block in the plurality of sub-blocks with the first detector, combining the data from each sub-block to produce an estimated data block, estimating the channel with the estimated data block, thereby producing a re-estimated channel, and re-detecting the data block with the re-estimated channel.

11. The method of claim 10, further comprising repeating the detecting data in each sub-block, the combining the data from each sub-block, the estimating the channel with the estimated data block, and the re-detecting the data block until a convergence criterion is met.

12. A method for receiver operations, the method comprising:
  receiving a data block over a channel;
  if there is no information related to the channel, detecting data in the data block with a first detector; and
  if there is information related to the channel,
    determining if there is confidence in the information related to the channel,
    detecting data in the data block with a second detector if there is confidence in the information, and
    detecting the data in the data block with the first detector if there is no confidence in the information,
    wherein the first detector uses a different detection technique than the second detector, and
  wherein the data block is partitioned into a plurality of sub-blocks, and wherein detecting the data in the data block with a second detector comprises:
    detecting data in each sub-block in the plurality of sub-blocks with the second detector;
    combining the data from each sub-block to produce an estimated data block;
    estimating the channel with the estimated data block, thereby producing a re-estimated channel; and
    re-detecting the data block with the re-estimated channel.

13. The method of claim 12, further comprising repeating the detecting data in each sub-block, the combining the data from each sub-block, the estimating the channel with the estimated data block, and the re-detecting the data block until a convergence criterion is met.

14. A receiver comprising:
  receive antennas configured to receive a data block on a wireless channel;
  a receive circuit coupled to the receive antennas and configured to perform analog-to-digital conversion of the data block to generate a digital data block;
  a processor coupled to the receive circuit, and configured to:
    determine if there is information related to the channel;
    if there is no information related to the channel, detect data in the digital data block with a first detector; and
    if there is information related to the channel, determine if there is confidence in the information related to the channel, detect data in the digital data block with a second detector if there is confidence in the information, and detect the data in the digital data block with the first detector if there is no confidence in the information, wherein the first detector uses a different detection technique than the second detector; and
  a storage memory coupled to the processor and configured to store the digital data block,
  wherein the processor is configured to detect the data in the data block with a joint detector in response to determining that there is partial confidence in the information, and
  wherein the joint detector makes use of the second detector in conjunction with the information.

15. The receiver of claim 14, wherein the information comprises a channel estimate.

16. The receiver of claim 14, wherein the information comprises a channel estimate, and wherein the processor configured to determine if there is confidence in information related to a channel comprises the processor configured to:
  compute a confidence value based on an error variance of the channel estimate;
  determine that there is confidence in the information if the confidence value is greater than or equal to a threshold; and
  determine that there is no confidence in the information if the confidence value is less than the threshold.

17. The receiver of claim 14, wherein the processor being configured to determine that there is partial confidence in the information comprises the processor being configured to determine that the confidence value is greater than a first threshold but less than a second threshold.

18. The receiver of claim 17, wherein the processor being configured to determine if there is confidence in the information related to the channel comprises the processor being configured to:
    determine that there is no confidence in the information if the confidence value is less than the first threshold; and
    determine that there is confidence in the information if the confidence value is greater than the second threshold.

19. The receiver of claim 14, wherein the information comprises a channel estimate, and wherein the processor configured to determine if there is confidence in information related to a channel comprises the processor configured to:
    retrieve a confidence value based on a error level of the channel estimate;
    determine that there is confidence in the information if the confidence value is greater than or equal to a threshold; and
    determine that there is no confidence in the information if the confidence value is less than the threshold.

20. The receiver of claim 14, wherein the second detector comprises a maximum likelihood detector.

21. The receiver of claim 14, wherein the first detector comprises a blind detection detector or a differential detector.

22. A receiver comprising:
    receive antennas configured to receive a data block on a wireless channel;
    a receive circuit coupled to the receive antennas and configured to perform analog-to-digital conversion of the data block to generate a digital data block;
    a processor coupled to the receive circuit, and configured to:
        determine if there is information related to the channel;
        if there is no information related to the channel, detect data in the digital data block with a first detector; and
        if there is information related to the channel, determine if there is confidence in the information related to the channel, detect data in the digital data block with a second detector if there is confidence in the information, and detect the data in the digital data block with the first detector if there is no confidence in the information, wherein the first detector uses a different detection technique than the second detector; and
    a storage memory coupled to the processor and configured to store the digital data block, wherein the information comprises a channel estimate, and wherein the processor configured to determine if there is confidence in information related to a channel comprises the processor configured to:
        compute a confidence value based on an error variance of the channel estimate;
        determine that there is confidence in the information if the confidence value is greater than or equal to a threshold; and
        determine that there is no confidence in the information if the confidence value is less than the threshold, wherein the confidence value is computed as $\beta = \sigma/\sigma_h$, where $\beta$ is the confidence value, $\sigma$ is a standard deviation of noise elements of V, V is an Nr×N matrix whose elements represent additive noise terms at each receive antenna at each time slot, $\sigma_h$ is a standard deviation of elements of W, and W is an error term affecting the channel estimate.

23. A receiver comprising:
    receive antennas configured to receive a data block on a wireless channel;
    a receive circuit coupled to the receive antennas and configured to perform analog-to-digital conversion of the data block to generate a digital data block;
    a processor coupled to the receive circuit, and configured to:
        determine if there is information related to the channel;
        if there is no information related to the channel, then detect data in the digital data block with a first detector; and
        if there is information related to the channel, determine if there is confidence in the information related to the channel, then detect data in the digital data block with a second detector if there is confidence in the information, and detect the data in the digital data block with the first detector if there is no confidence in the information, wherein the first detector uses a different detection technique than the second detector; and
    a storage memory coupled to the processor and configured to store the digital data block,
    wherein the data block is partitioned into a plurality of sub-blocks, and
    wherein the processor being configured to detect data in the data block with a first detector or detect the data in the data block with the first detector in response to determining that there is no confidence in the information comprises the processor being configured to detect data in each sub-block in the plurality of sub-blocks with the first detector, combine the data from each sub-block to produce an estimated data block, estimate the channel with the estimated data block to produce a re-estimated channel, and re-detect the data block with the re-estimated channel.

24. The receiver of claim 23, wherein the processor is configured to repeat the detecting data in each sub-block, the combining the data from each sub-block, the estimating the channel with the estimated data block, and the re-detecting the data block until a convergence criterion is met.

25. A receiver comprising:
    receive antennas configured to receive a data block on a wireless channel;
    a receive circuit coupled to the receive antennas and configured to perform analog-to-digital conversion of the data block to generate a digital data block;
    a processor coupled to the receive circuit, and configured to:
        determine if there is information related to the channel;
        if there is no information related to the channel, then detect data in the digital data block with a first detector; and
        if there is information related to the channel, determine if there is confidence in the information related to the channel, then detect data in the digital data block with a second detector if there is confidence in the information, and detect the data in the digital data block with the first detector if there is no confidence in the information, wherein the first detector uses a different detection technique than the second detector; and
    a storage memory coupled to the processor and configured to store the digital data block,
    wherein the data block is partitioned into a plurality of sub-blocks, and
    wherein the processor being configured to detect the data in the data block with a second detector comprises the processor being configured to detect data in each sub-block in the plurality of sub-blocks with the second detector, combine the data from each sub-block to produce an estimated data block, estimate the channel with the estimated data block to produce a re-estimated channel, and re-detect the data block with the re-estimated channel.

26. The receiver of claim 25, wherein the processor is configured to repeat the detecting data in each sub-block, the combining the data from each sub-block, the estimating the channel with the estimated data block, and the re-detecting the data block until a convergence criterion is met.

* * * * *

UNITED STATES PATENT AND TRADEMARK OFFICE
CERTIFICATE OF CORRECTION

| | | |
|---|---|---|
| PATENT NO. | : 8,699,606 B2 | Page 1 of 1 |
| APPLICATION NO. | : 12/871611 | |
| DATED | : April 15, 2014 | |
| INVENTOR(S) | : Meriam Khufu Ragheb Rezk et al. | |

It is certified that error appears in the above-identified patent and that said Letters Patent is hereby corrected as shown below:

In the Claims

In Col. 27, line 16, claim 19, delete "a error" and insert --an error--.

Signed and Sealed this
Twenty-fourth Day of June, 2014

Michelle K. Lee
*Deputy Director of the United States Patent and Trademark Office*